US011956483B2

(12) United States Patent
Chetty

(10) Patent No.: US 11,956,483 B2
(45) Date of Patent: Apr. 9, 2024

(54) MULTI-LEVEL CONTENT DELIVERY SYSTEM AND METHOD THEREOF

(71) Applicant: Vijay Raghavan Chetty, Santa Monica, CA (US)

(72) Inventor: Vijay Raghavan Chetty, Santa Monica, CA (US)

(73) Assignee: Digital Mailbox, Inc., Santa Monica, CA (US)

( * ) Notice: Subject to any disclaimer, the term of this patent is extended or adjusted under 35 U.S.C. 154(b) by 12 days.

(21) Appl. No.: 17/693,219

(22) Filed: Mar. 11, 2022

(65) Prior Publication Data
US 2022/0295124 A1    Sep. 15, 2022

Related U.S. Application Data

(60) Provisional application No. 63/256,530, filed on Oct. 15, 2021, provisional application No. 63/160,648, filed on Mar. 12, 2021.

(51) Int. Cl.
*H04L 12/40*    (2006.01)
*G06F 17/00*    (2019.01)
(Continued)

(52) U.S. Cl.
CPC ....... *H04N 21/23109* (2013.01); *G06F 17/00* (2013.01); *G06Q 10/107* (2013.01);
(Continued)

(58) Field of Classification Search
CPC ....... H04N 21/23109; H04N 21/25841; H04N 21/25875; H04N 21/266; H04N 21/2747;
(Continued)

(56) References Cited

U.S. PATENT DOCUMENTS

| 7,440,887 B2 | 10/2008 | Soulet |
| 9,197,638 B1 | 11/2015 | Livesay et al. |

(Continued)

FOREIGN PATENT DOCUMENTS

| CN | 1345688 A | 4/2002 |
| CN | 1266629 C | 7/2006 |

(Continued)

OTHER PUBLICATIONS

Gaines, B. R.. "Supporting Collaboration through Multimedia Digital Document Archives." L. Katz y, Ot., The Canadian Multimedia Conference Proceedings. Calgary the University of Calgary. https//www.researchgate.net/profile/Brian-Gaines-2/publication/2459180_Supporti ng_Collaborationthrough_Multimedia_Digital_DocumentArchives/links/56e1ab9708ae4bb9771 bbl 1f/Supporting-Collaboration-through-Multimedia-Digital-Document-Archives. pdf. 1994. Nov. 1994 (Nov. 1994).

(Continued)

*Primary Examiner* — Khoi V Le
(74) *Attorney, Agent, or Firm* — Rutan & Tucker, LLP

(57) ABSTRACT

An embodiment of a digital content distribution system for a delivery of digital materials through digital mailbox systems is described. The digital content distribution system features a virtual processor and a plurality of digital mailbox systems. Each digital mailbox system is configured to operate as a data store addressable by a digital mailbox address that is uniquely associated with a physical address and is assigned to one or more registered users associated with a property identified by the physical address. For instance, a first digital mailbox system is configured to transmit digital materials to and receive digital materials from a second digital mailbox system different than the first digital mailbox system and one or more registered users are provided access (Continued)

to the digital materials received by the first digital mailbox system upon authentication.

32 Claims, 13 Drawing Sheets

(51) Int. Cl.
    *G06Q 10/107*    (2023.01)
    *G07B 17/00*     (2006.01)
    *H04N 21/231*    (2011.01)
    *H04N 21/258*    (2011.01)
    *H04N 21/266*    (2011.01)
    *H04N 21/2747*   (2011.01)

(52) U.S. Cl.
    CPC .......... *G07B 17/00459* (2013.01); *H04L 12/40006* (2013.01); *H04N 21/25841* (2013.01); *H04N 21/25875* (2013.01); *H04N 21/266* (2013.01); *H04N 21/2747* (2013.01)

(58) Field of Classification Search
    CPC .......... G06F 17/00; G06Q 10/107; G07B 17/00459; H04L 12/40006
    See application file for complete search history.

(56) References Cited

U.S. PATENT DOCUMENTS

| | | | |
|---|---|---|---|
| 10,673,647 B2 | 6/2020 | Pancari | |
| 2002/0002590 A1 | 1/2002 | King et al. | |
| 2002/0103932 A1* | 8/2002 | Bilbrey | G06Q 10/107 707/999.107 |
| 2004/0019645 A1* | 1/2004 | Goodman | H04L 67/02 709/206 |
| 2004/0125957 A1* | 7/2004 | Rauber | H04N 21/2541 380/259 |
| 2004/0205137 A1 | 10/2004 | Chen et al. | |
| 2004/0267889 A1* | 12/2004 | Graham | G06F 21/10 709/206 |
| 2007/0156829 A1 | 7/2007 | Deboy et al. | |
| 2007/0299920 A1 | 12/2007 | Crespo et al. | |
| 2009/0132662 A1* | 5/2009 | Sheridan | H04L 51/226 709/206 |
| 2009/0138730 A1* | 5/2009 | Cook | G06Q 20/10 713/193 |
| 2010/0120454 A1 | 5/2010 | Xiao et al. | |
| 2012/0179909 A1 | 7/2012 | Sagi et al. | |
| 2013/0179949 A1* | 7/2013 | Shapiro | H04L 63/08 726/4 |
| 2013/0226929 A1 | 8/2013 | Yeerelly et al. | |
| 2014/0189018 A1* | 7/2014 | Nawaz | G06Q 50/32 700/227 |
| 2015/0039409 A1* | 2/2015 | Marsico | G06Q 30/0217 705/14.1 |
| 2015/0201250 A1* | 7/2015 | Yaroshenko | H04N 21/25833 725/35 |
| 2016/0358123 A1 | 12/2016 | Pancari | |

FOREIGN PATENT DOCUMENTS

| | | | |
|---|---|---|---|
| KR | 102153033 B1 | 9/2020 | |
| WO | 2000/022787 A2 | 4/2000 | |
| WO | WO-0022787 A2 * | 4/2000 | ............ H04L 51/30 |
| WO | 2017119831 A1 | 7/2017 | |

OTHER PUBLICATIONS

PCT/US2022/062962 filed Dec. 10, 2021 International Search Report and Written Opinion dated Mar. 18, 2022.
"Freedom Mailbox" <https://www.freedommailbox.com/partners/digital-mailbox-software/> last accessed Sep. 4, 2021.
"GhanaPost—Frequently Asked Questions(FAQs)" <https://www.ghanapostgps.com/get-help/>, last accessed Sep. 4, 2021.
Melendez, S. "The Post Office in the Cloud" <https://www.fastcompany.com/3048460/the-post-office-in-the-cloud>, Jul. 20, 2015.
U.S. Postal Service Office of Inspector General, "The Postal Service Role in the Digital Age," <https://www.uspsoig.gov/sites/default/files/document-library-files/2015/rarc-wp-11-003_0.pdf>, pp. 1-39, dated Apr. 19, 2011.

* cited by examiner

MULTI-LEVEL CONTENT DELIVERY SYSTEM AND METHOD THEREOF

CROSS-REFERENCE TO RELATED APPLICATIONS

This application claims the benefit of priority on U.S. Provisional Application No. 63/160,648 filed Mar. 12, 2021 and U.S. Provisional Application No. 63/256,530 filed Oct. 15, 2021, the entire contents of both of which are incorporated by reference herein.

FIELD

Embodiments of the disclosure are directed to a multi-level content delivery system that provides for direct transmission of digital content over a network from a source to a targeted destination associated with a physical (geographic) address based on knowledge of that physical address.

GENERAL BACKGROUND

Even now, in the age of digital communications, we still send and receive a substantial amount of printed material via regular mail from different types of sources. Businesses spend billions of dollars every year to print and mail marketing materials (e.g., brochures, flyers, sale items, coupons, solicitations etc.) as well as communicative or financial materials (e.g., bills, invoices, bank/credit card statements, checks, etc.). The printing and distribution of these marketing & financial materials wastes a vast amount of natural resources. In fact, millions of trees are cut down every year to produce paper for these printed materials, most of which are thrown away immediately after receipt.

Also, these printed materials are delivered to a designated physical (mailbox) address located by a street address or P.O. Box address. The physical delivery of the printed materials is not only labor intensive and costly, but it is also unfriendly to the environment. As known, the physical delivery of the printed materials is conducted by mail trucks, where such usage of mail trucks increases the amount of pollutants released into the air as well as increases the amount of road traffic on highways and streets that are already operating at maximum capacity.

A digital content distribution system configured for the delivery of digital content routed in accordance with the physical address of the intended recipient, generally referred to as "digital mail" or specifically referred to as a "digital mail message," is needed to eliminate the need to print and mail marketing, financial & communicative materials in order for this industry to collectively realize a reduced carbon footprint.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
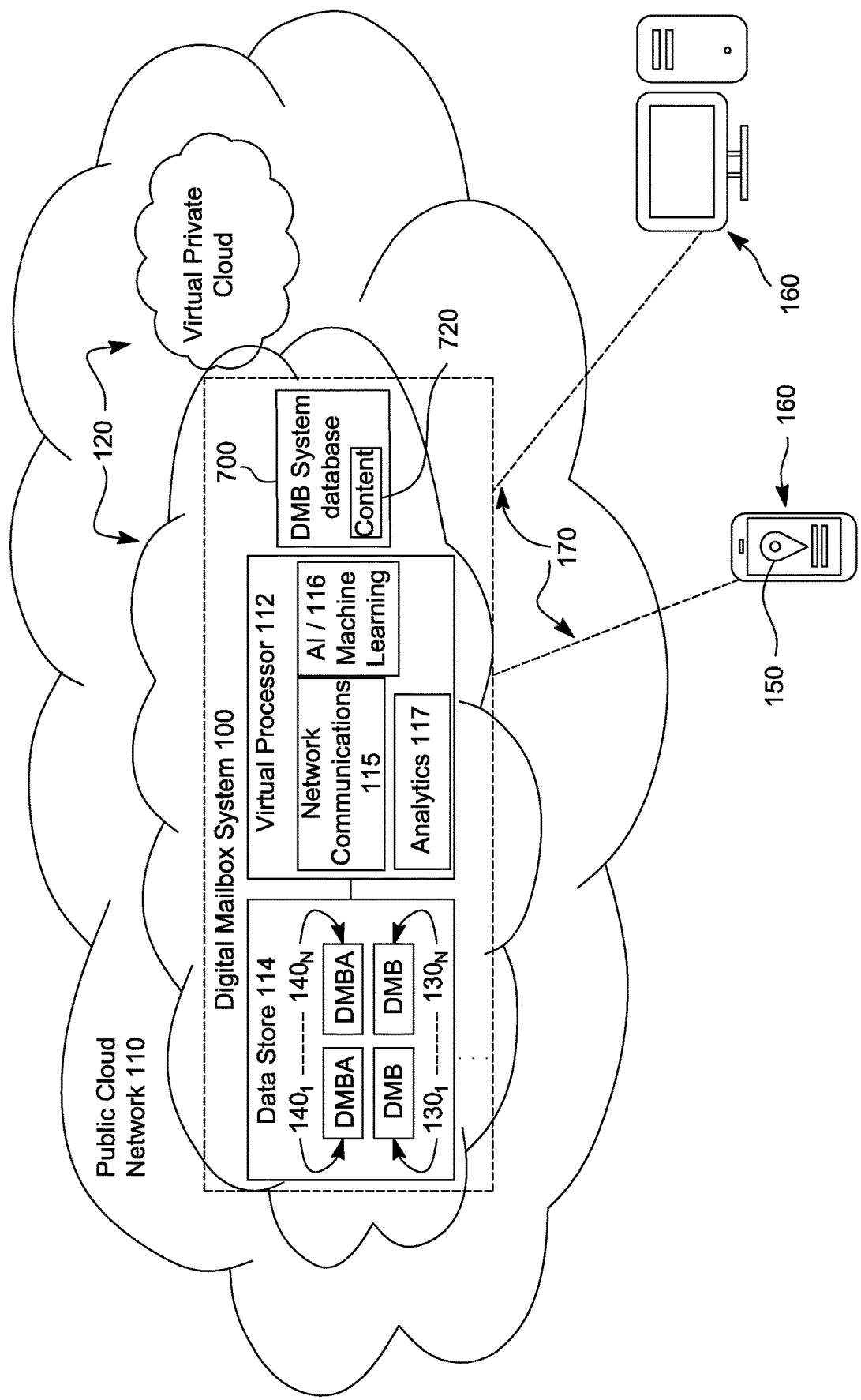
FIG. 1 is a first exemplary embodiment of a digital mailbox (DMB) system.

Embodiments of the invention describe a system configured to deliver digital content in lieu of printed materials electronically in a seamless and secure manner. This digital content delivery is based on one-to-one mapping between a physical (geographical) mailing address and a data store operating as a source or destination for the digital content. Based on knowledge of the physical (mailing) address at which a recipient resides, a sender is able to directly send digital content to the recipient based on a network address corresponding to the physical address.

In general, the digital content distribution system (also referred to as a "Digital Mailbox System" or "DMB System or DMBS") is focused on the implementation of an "open" digital mailbox in the cloud for every physical (mailing) address on a region, country or global scale to enable delivery of all printed material virtually instead of printing and mailing such materials to a residence or business. Each digital mailbox is assigned to or accessible by one or more registered users associated with a property situated at a physical (mailing) address. Also, each digital mailbox enables the transmission of all digital material using that physical (mailing) address, without using an email address specifically assigned to a targeted recipient or granting permissions or sharing of links between the sender and the recipient. An open "digital mailbox" may correspond to a software construct that permits a sender to provide digital material to a recipient without any permissions from the recipient, and with or without knowing that the particular registered or authorized user resides or works at the physical (mailing) address.

According to one embodiment of the disclosure, a digital mailbox (DMB) is configured to receive digital mail from any system users, but only users who are authorized or registered for that particular DMB (or DMB address) can access and view its stored contents. Additionally, a sender may send a digital mail message anonymously by not including content within a "From" address field of the digital mail message. Alternatively, the sender can select a "mask" tag, which operates as a selectable feature for the digital mail message that, at transmission or during routing of the digital mail, prompts removal of content within the 'From" address field prior to delivery of the digital mail message.

While the DMB system may route/deliver all digital mail to other respective DMB(s) based on the mailing address, registered/authorized users can setup their own rules (sometimes referred to as "transmission rules or routing instructions") for accepting incoming digital mail. For example, users can decide what type of digital mail they want to receive or don't want to receive such as "don't deliver any junk digital mail," or "don't deliver certain categories or types of digital mail" or "don't deliver digital mail from specific sender(s)," etc. Any incoming digital mail not accepted by the recipient based on prescribed routing instructions may be blocked from transmission or sent to the trash folder in the recipient's DMB.

Herein, a "mailing address" includes, but not limited to, a post office box (PO Box) or physical street address of a selected property (e.g., any residential, commercial, agricultural, or public property; developed or undeveloped land). In other words, in most developed countries, every physical property or location may be assigned a mailing address. For instance, domestically, a mailing address may include a street number, street name, suite/unit/apartment number, city, state, country and zip code. In many other parts of the world, a mailing address may include locality name, community name or some other names for identifying the property/location. All domestic mailing addresses are already available with the United States Postal Service and many other governmental agencies and independent third-party databases. Similarly, mailing addresses for all countries and regions globally are readily available within their respective government agencies and numerous other independent third-party databases.

As described herein, the digital mailboxes (DMBs) do not constitute email inboxes and the DMB system does not constitute an email system because none of these virtual components rely on an email address associated with any mailing address or a mapping to an email address. Mapping a mailing address to an email address has numerous issues, notably a permanent association between the email address and a user independent of her or his place of residence. Further, an individual may have multiple email addresses, can add/change/delete email addresses at any time, an email address is not linked to a specific physical (mailing) address, and there may be multiple occupants within the same mailing address. Similarly, mapping a mailing address to an electronic storage unit outside of a private network would not provide an open DMB system with seamless transmission of data between DMBs and physical address connectivity along with certain functions such as registration, access controls, layout, configuration, user generated profiles, transmission rules, routing instructions, distribution rules, data transmission between digital mailboxes, privacy and security, as described below.

According to one embodiment of the disclosure, the DMB system is configured for sending and receiving digital materials (e.g., original digital content, digital content converted from printed material, etc.) through a primary digital mailbox (hereinafter referred to as "primary DMB") or one or more secondary DMBs (hereinafter referred to as "sub-DMBs"). According to this embodiment of the disclosure, each primary DMB uniquely corresponds to a physical (mailing) address. Optionally, each primary DMB may pertain to (and be accessed by) one or more DMB users, who may also be associated with one or more sub-DMBs for which incoming digital materials are filtered and segmented by intended DMB user.

According to another embodiment of the disclosure, the DMB system may create/assign a DMBU (Digital Mailbox-User) for each registered individual user. All digital mail pertaining to a DMBU may be routed from all applicable DMBs associated with that DMBU. The DMBs and DMBUs may be configured to transmit data between each other and automatically establish links between them based on registration/access controls.

As a result, the DMB system is configured to eliminate the need to physically mail most types of printed content, which will conserve natural resources and save billions of dollars for businesses in paper, printing, ink, postage, handling, labor and time. Also, this platform will significantly improve air quality by reducing pollutants released into the environment from the production and delivery of paper and the printed content and contribute to preserving our environment for future generations.

I. Terminology

In the following description, certain terminology is used to describe features of the invention. In certain situations, the terms "logic" and "computing device" is representative of hardware, software or a combination thereof, which is configured to perform one or more functions. As hardware, the logic (or computing device) may include circuitry having data processing or storage functionality. Examples of such circuitry may include, but are not limited or restricted to a processor (e.g., a microprocessor, one or more processor cores, a programmable gate array, a microcontroller, an application specific integrated circuit, or the like), semiconductor memory, persistent storage, or the like.

Alternatively, or in combination with the hardware circuitry described above, the logic (or computing device) may be software in the form of one or more software modules. According to one embodiment of the disclosure, the software module(s) may operate as a virtual component such as a virtual (logical) processor or a virtual memory. Additionally, or in the alternative, the software module(s) may be constructed as an executable application, an application programming interface (API), a subroutine, a function, a procedure, a routine, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a data store, where the data store may be a physical or logical representation of a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

Herein, the term "message" generally refers to information in a prescribed format and transmitted in accordance with a suitable delivery protocol. Hence, each message may be in the form of one or more packets, frames, or any other series of bits having the prescribed format. The term "digital mail" generally refers to a message transmitted from a source to a destination within the digital mailbox system, such as a message from one digital mailbox (DMB) to one or more DMBs within the digital mailbox system.

The term "interconnect" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

An "administrator" is a person or persons authorized with access controls to the DMB in its entirety, or to certain functions and features of the primary and/or sub-DMBs or to portions of the DMB such as one or more DMBs and/or one or more sub-DMBs. According to one embodiment of the disclosure, the administrator has access controls to add/change/delete both registered users and authorized users from permitted access and association with certain primary DMB(s) and/or sub-DMB(s).

A "registered user" is a person or entity who has been validated, authenticated and/or registered for one or more specific DMBs (e.g., primary DMB(s) and/or sub-DMB(s)). A registered user occupies (e.g., lives or works) at the mailing address associated with DMBs, owns or leases that business or property, or has authorized access to a PO Box address associated with the DMB. A registered user may 'grant access' to his or her DMB to a guest visiting his/her home or a roommate moving into his/her home from a different location, but unable to provide proof of address (as described later).

An "authorized user" is authorized or given access to those primary DMB(s) and/or sub-DMB(s), but may not occupy the mailing address associated with the primary DMB(s) and/or sub DMB(s). As an illustrative example, a 75-year old Mary Jane living alone at 789 XYZ Lane is a registered user for that primary DMB. Mary Jane can authorize her son and/or daughter, who may live in a different address, to have access and/or administration rights to her primary and/or sub DMBs.

Finally, the terms "or" and "and/or" as used herein are to be interpreted as inclusive or meaning any one or any combination. As an example, "A, B or C" or "A; B; or C" or "A, B and/or C" or "A; B; and/or C" mean "any of the following: A; B; C; A and B; A and C; B and C; A, B and C." An exception to this definition will occur only when a combination of elements, functions, steps or acts are in some way inherently mutually exclusive.

II. Architecture—Digital Mailbox System

Referring to FIG. 1, a first exemplary embodiment of a digital mailbox system (DMB system) 100 is shown. For this embodiment, the DMB system 100 is a communication platform deployed within a public cloud network 110 or spans multiple public cloud networks. In particular, as shown, the DMB system 100 may be implemented as part of one or more virtual private cloud networks (VPCs) 120, which are deployed as part of the public cloud network 110. For example, the DMB system 100 may be maintained with multiple VPCs 120 located at different geographic regions of the public cloud network 110 (e.g., processor/data store operability at multiple VPCs 120).

The DMB system 100 may include physical or virtual (logical) components such as physical or virtual servers, data stores (e.g., electronic storage, databases, etc.) along with cloud-based software to store, access and share data as well as execute a variety of programs including programs directed to analytics, artificial intelligence (AI), or the like. As shown, the DMB system 100 may include one or more processors 112 and one or more data stores 114. For this embodiment of the disclosure, the processor 112 may constitute a physical processor or a virtual processor constituting a software instance whose underlying operations are based on a physical processor. An example of a virtual processor may include, but is not limited or restricted to, an Amazon® EC2, AWS® Lambda, virtual machines, Azure® compute units, Google® compute engines, or the like. Similarly, the data store 114 may constitute physical storage or virtual storage such as cloud-based storage (e.g., Amazon® S3, storage elements with Azure® storage platform, Google® object storage, etc.).

Herein, as shown, the virtual processor 112 may be configured to perform different types of operations including network-based communication processes 115 to receive and route digital mail from an application instance with access to a digital mailbox or a virtual public DMB station to one or more primary digital mailboxes (described below). The virtual processor 112 may be further configured to perform AI processes 116 (e.g. supervised machine learning, unsupervised machine learning, etc.) and/or analytics 117, which may be directed to multi-phase analyses for incoming or outgoing digital mail to determine appropriate DMB storage or DMB/sub-DMB routing as illustrated in FIGS. 3-5B and described below.

Besides the DMB system 100, an application instance 150 (e.g., executable application software, plug-in, etc.) may be available for download and installation on any number of computing devices 160 (e.g., computers such as desktops, laptops, chromebooks or tablets; mobile devices such as cellular smartphones or wearables, etc.). The DMB application instance 150 may be configured to send and receive information to/from the DMB system 100 over wireless or wired interconnects 170 as well as display digital mail messages received and being created for transmission.

A digital mailbox (e.g., DMB $130_1$) constitutes a "virtual mailbox," which is a data store that uniquely corresponds to a physical mailbox and is implemented as part of the DMB system 100. As a data store, according to one embodiment of the disclosure, the DMB $130_1$ can be implemented as a separate (virtual) storage unit, a portion of virtual memory representing physical memory that supports a plurality of DMBs, a data structure that is stored within the virtual storage unit, or the like. The DMB $130_1$ relies on the operations controlled by the virtual processor 112 to securely receive, send, store, manage, access and/or share any kind of digital content. As shown, the DMB system 100 includes a plurality of primary DMBs $130_1$-$130_N$ (N>1), where each of the plurality of primary DMBs $130_1$-$130_N$ uniquely corresponds to a physical (mailing) address with a prescribed region (e.g. country, state, city, etc.). The use of these primary DMBs $130_1$-$130_N$ enables digital communications over networks forming a part of the multi-tiered, content delivery system with sources/destinations based on physical addresses.

Herein, a plurality of primary digital mailbox addresses (DMBA) $140_1$-$140_N$, corresponding in number to the primary DMBs $130_1$-$130_N$, may be created inside the DMB system 100. Each DMBA $140_1$ . . . or $140_N$ uniquely corresponds to a physical (mailing) address. Hence, only one DMBA shall be created for each physical (mailing) address and one primary DMB $130_1$ ... or $130_N$ uniquely corresponds to each DMBA $140_1$ ... or $140_N$ inside the DMB system 100. The DMBA $140_1$ ... or $140_N$ may be copied, duplicated, re-created or mapped from the physical (mailing) address.

As an illustrative example, for physical (mailing) address: 123 ABC lane; Los Angeles, Calif. 90015, the DMB system 100 may be configured to replicate and support a DMBA $140_1$ that corresponds to the same physical address (123 ABC Lane, Los Angeles, Calif. 90015), where the DMBA $140_1$ is retained for one or more users associated with the physical address, unlike email addresses that are associated with the user. It is contemplated the DMB system 100 will replicate only one primary DMB for each DMBA $140_1$ ... or $140_N$ supported by the DMB system 100. It is contemplated that, as every physical (mailing) address is unique and is created or determined by a local, regional or national government agency, only one DMBA $140_1$ ... or $140_N$ corresponding to the physical (mailing) address is created, and thereby every DMBA $140_1$-$140_N$ is unique, to ensure the integrity of the DMB system 100. The DMB system 100 is configured to ensure that no DMBAs can be created within the DMB System 100 that does not have a corresponding physical (mailing) address.

In today's digital world, all printed material is first created in a digital file/format and then printed on paper for mailing. The digital material to be sent or received to/from this DMB system 100 can be any type of file/format such as DOC, XLSX, PPT, PDF, JPG, TIF, HTML, ZIP, AVI, MPEG, WMV, MOV, QT, MTS, TS, et al., that are commonly used and available in the market.

III. Registration and Access Controls

Figure 2:
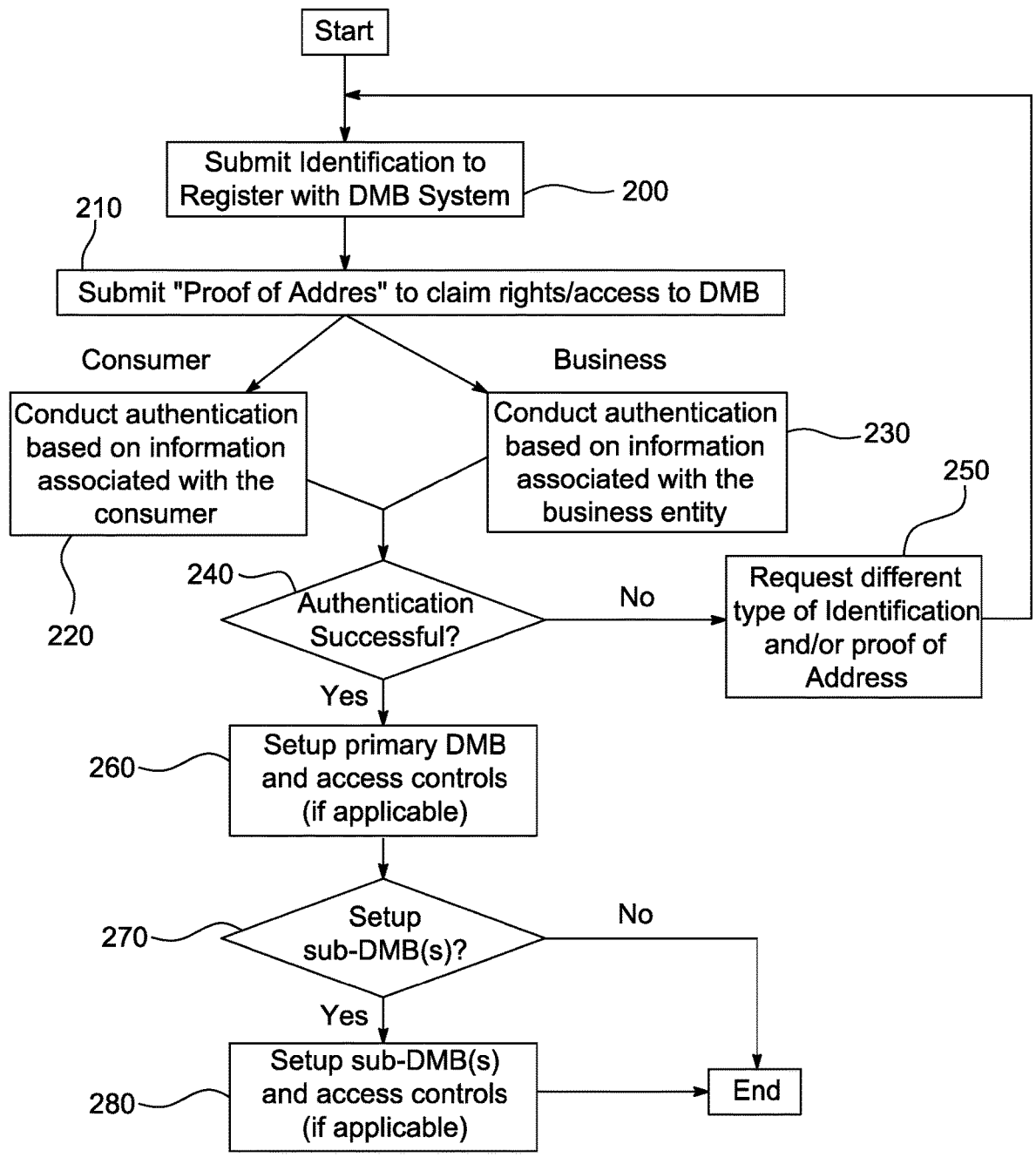
FIG. 2 is an exemplary embodiment of a registration process for the DMB system of FIG. 1, including a primary DMB and optional sub-DMB(s) is shown.

Referring now to FIG. 2, an exemplary embodiment of a registration process for the DMB system 100 of FIG. 1, including a primary DMB and optional sub-DMB(s) is shown. Herein, users with preferences to send and/or receive digital mail (instead of printed and physical mail) may register with this DMB system (operation 200). To register, a digital mailbox application is downloaded onto a computing device and launched. During an initial launch, a signup query is commenced to allow the user to register her or his login and password combination. Upon successful registration by a user (e.g., a consumer for herself/himself or a person on behalf of a business entity), the DMB system may require the user to authenticate herself or himself by providing one or more forms of identification to verify the identity of the individual and proof of address that she or he has the rights to claim access to the DMB and/or authorized to access the DMB associated with a particular mailing address (operation 210).

As shown in block 220, such authentication for the user may include the generation of interactive displays on the digital mailbox application for entry or capture and upload of requested information to confirm the identity of the individual and proof of address of the user to verify the user occupies the physical address or has the rights to the digital mailbox for that mailing address and/or is permitted access to incoming digital mail directed to occupants of the physical address. Examples of the requested information may include, but are not limited or restricted to, one or more of the following: name (first/middle/last); date of birth; social security number; driver's license information; passport information; image of government issued identification (ID); military ID card; biometric information; facial data; voice snippet; voter registration information; mortgage statement; home or vehicle insurance policy; utility bill; home phone and/or cell phone, or the like.

Similarly, as shown in block 230, authentication for a business entity may include the generation of interactive displays on the digital mailbox application for entry or capture and upload of requested information to confirm permitted access on behalf of the business entity. Examples of the requested information may include, but are not limited or restricted to, one or more of the following: federal tax ID number; state ID number; corporate ID number; any government issued identification for the business, local, regional or national business permit; images of insurance documents; utility bills; or business stationery; customer/vendor communications; business website address; corporate records, or the like.

Alternatively, in addition to or in lieu of verification/authentication based on one or more of the above documents submitted by users of residential and commercial addresses, the DMB system may send a physical postcard with a unique code to the mailing address and request the user to enter that code online to claim access to the requested DMBs.

One or more of the above-mentioned identification and proof of address information may be used by the DMB system to ensure that the individual or business entity registering or requesting access for the DMB for a particular "mailing address" resides at that address or operates its business from that address or registered to do business in that address or has the right to access the DMB for that 'mailing address' (operation 240). Otherwise, the DMB system may request a different type or types of identification and proof of address information than the provided information (operation 250). After successful authentication, the DMB system allows the user (e.g., consumer or an administrator for the business entity) to set-up access controls for the primary DMB along with a financial account (e.g., digital wallet, etc.) from which costs associated with the transmission of certain digital mail messages may be deducted (operation 260). Additionally, as an optional feature, after successful authentication, the DMB system allows the user (e.g., consumer or administrator) to set-up access controls for sub-DMBs where sub-DMBs are utilized (operations 270-280).

It is contemplated the DMB system may be integrated with or configured to access data stores (e.g., databases, etc.) associated with local, regional or national government agencies or independent third-party to verify the information provided by the consumers and businesses are authentic, reliable and valid before registering them or granting them access to requested DMB(s). Hence, the authentication process may be conducted by artificial intelligence (AI)-based logic 116 of FIG. 1 to ensure the information provided is authentic, reliable and valid before registering them in the DMB system and giving them rights/access to the requested DMB(s). For example, the AI-based logic may conduct an analysis of a submitted document (e.g., identification and/or proof of address information) and verifies its authenticity to associate the user (e.g., consumer or business entity) to the DMB. Herein, the AI-based logic may be a machine-learning (ML) program that conducts analytics of the submitted document based on supervised training of similar company or governmental documents.

Note that many different authentication methods may be used to ensure that the consumers and businesses registering or requesting access to particular DMB(s) are authorized and have the right to access the DMB(s) associated with those mailing addresses. For instance, in lieu of being automated, the authentication process may involve manually verifying the information with government agencies and third-party databases or mailing a postcard with a unique code to the mailing address and requesting the user to enter the unique code online before granting them access to the requested DMB(s).

The set-up of access controls for the primary DMB and/or sub-DMB(s) may involve configuration of the profile associated with the digital mailbox address by the registered users, where the configuration may be adjusted to request notification or the forwarding of all or certain types of incoming digital mail messages. More specifically, a registered user may enter her or his email address and/or cell numbers to which a notification may be sent and/or forward all or certain incoming digital mail messages to an electronic device as a text message or an email message for example. Additionally, or in the alternative, the sender of the digital mail can also request a notification to be directed to her or his DMB or via text or email when the recipient receives, opens and/or reads the digital mail.

A registered user may have access and/or administration rights to one or more primary and sub-DMBs. As an example, John Doe may live at 123 ABC Lane, Los Angeles, Calif. 90015; own a vacation home at 456 DEF Lane, Santa Barbara, Calif. 99999; work for XYZ company and own a business that has a PO Box address. John Doe may have administrator and/or registered user rights/access to the primary DMB for his home, vacation home and PO Box address, and may have access to a sub-DMB at XYZ Company. Instead of logging in and checking each one of the primary DMB and sub-DMBs, John Doe can set up a notification to receive text or email for all or certain categories or types of incoming digital mail messages from any one or more of the primary and sub-DMB(s). Additionally, or in the alternative, John Doe can set up a forwarding scheme, such as forwarding all or certain categories or types of incoming digital mail from all or some of the primary & sub-DMB(s) to his text or email address or to a specific primary DMB and/or sub-DMB so that he can check all incoming digital mail in one DMB rather than logging in and checking multiple DMBs.

Note that all such forwarding and cross communications between one or more primary DMB(s) and sub-DMB(s) within the DMB system shall be based on a digital mailbox address (DMBA). Since this entire DMB system is digital, users can access their DMB from any device from anywhere. When they turn on their TV, they may see a message "you've got digital mail".

The internal profiles/routing/distribution rules for incoming digital mail messages may be determined by the administrators and registered/authorized users of the primary and sub-DMB(s) in many different ways. All such profiles and distribution rules may be maintained at the primary and sub-DMB level or uploaded to the DMB system, operating as a Virtual Private Cloud for example, for routing incoming digital mail directly to the respective primary and sub-DMB(s) for easy access and faster execution.

IV. Setting Up Primary DMBs and Sub-DMBs

Figure 3:
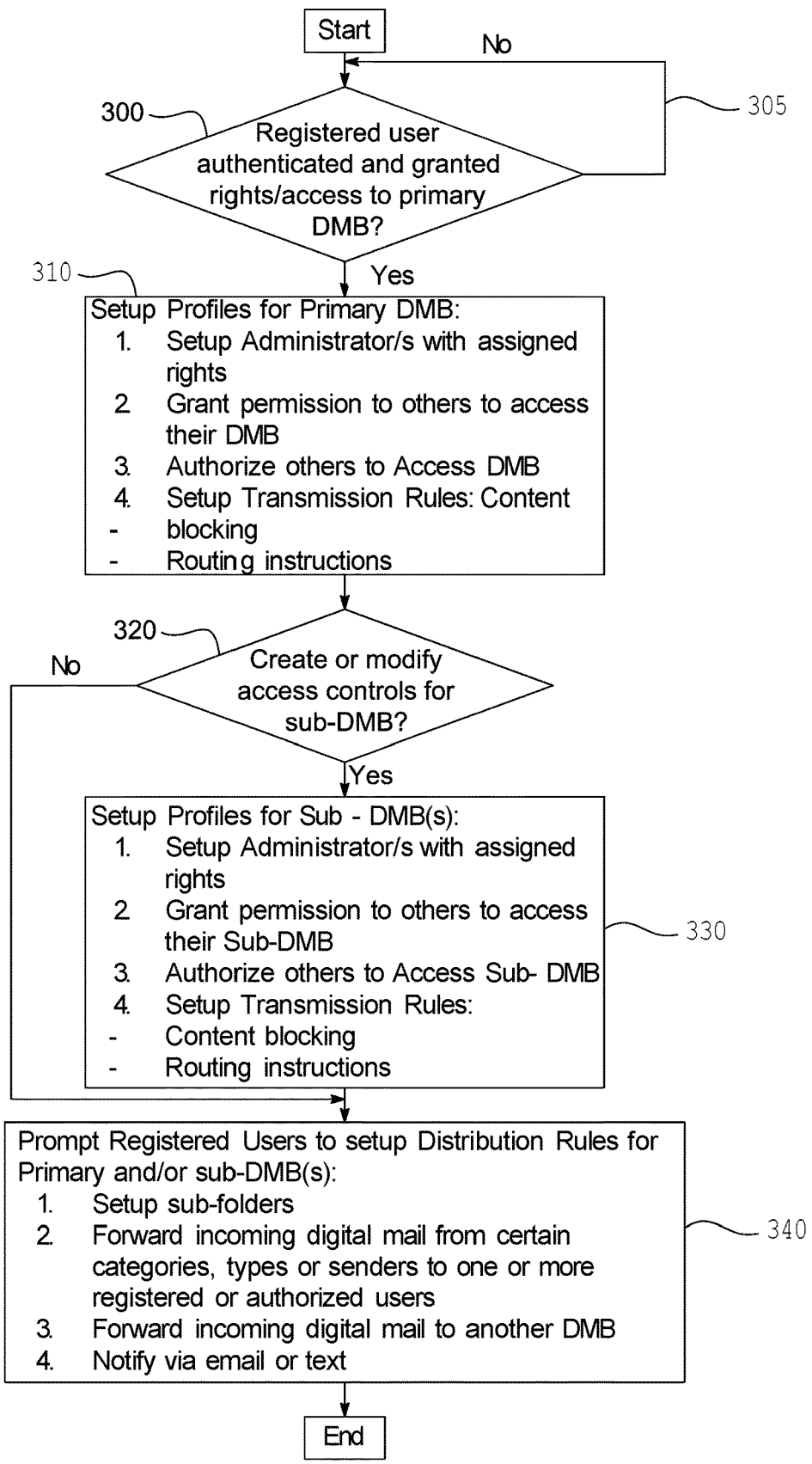
FIG. 3 is an exemplary embodiment of the formulation and configuration of different types of DMBs, notably the primary DMB and/or one or more optional sub-DMBs.

Referring now to FIG. 3, the formulation and configuration of different types of DMBs, namely the primary DMB and/or one or more optional sub-DMBs is shown. Herein, a first determination is made whether a registered user has been authenticated and granted rights/access for a certain primary DMB (operation 300). If not (no), the DMB system does not provide the registered user rights/access to the primary DMB for conducting a profile setup (operation 305). If so (yes), the DMB system allows the registered user for setup (configuration) of profiles for the primary DMB (operation 310), which may include:

a. Setting up administrator(s) with assigned rights (as described later)
b. Granting permission to others to access their DMB: A registered user may grant permission to another user to access their DMB. As an example, if a new roommate who moved into an apartment is unable to provide proof of address because all his/her documentation has their old address, then another roommate (a registered user) may grant permission to this new roommate to access their DMB.
c. Authorizing others to have access to their DMB. In one embodiment of the invention, if a registered user authorizes someone else, the authorized user may have complete access to the registered user's DMB. Alternatively, the DMBS may copy all incoming and outgoing digital mail from registered user's DMB to authorized user's DMB, and
d. Transmission rules such as ingress controls (e.g., blocking content from certain sources or certain content types) and/or egress controls such as transmission restrictions, or the like.

After profiles have been setup for the primary DMB, a determination is made whether there is interest in creating or modifying access controls for sub-DMB(s) associated with this primary DMB (operation 320). If so, the DMB system further allows for setup (configuration) of profiles for some or all of the sub-DMB(s) associated with the primary DMB (operation 330). This may include setting up administrator(s) with assigned rights and/or granting permission to other registered user(s) with access to the sub-DMB, authorizing others to access their sub-DMB, along with transmission rules such as ingress controls (e.g., blocking content from certain sources or certain content types) and/or egress controls such as transmission restrictions for that sub-DMB. This grant of access may be conducted for a sub-DMB, especially where the sub-DMB constitutes a department or sub-department in a business DMB to grant administrators and/or other employees access to the sub-DMB.

In one embodiment of the invention, the transmission rules may be determined by any administrator, registered or authorized user. As an example, the transmission rules may include, but are not limited or restricted to one or more routing instructions such as: (a) block certain content (e.g., adult material) from transmission to a minor's sub-DMB; (b) route a copy of common digital mail (incoming digital mail not addressed to any registered user within that primary DMB such as 'current resident') to one or more registered or authorized users; and/or (c) route/copy certain 'categories' or 'types' of digital mail or from specific senders to one or more registered or authorized users etc. All such transmission rules shall be maintained within the profile section of the primary and/or sub-DMBs.

In another embodiment of the invention, the DMB system may setup "Hierarchy of Rights" to avoid conflicts when there are multiple administrators, registered and/or authorized users of a residential or commercial primary and sub-DMBs. The Hierarchy of Rights may include the following: (1) First Priority: "Super" administrator such as a parent, head of household or business owner, or the like (a sole Super administrator may be associated with a DMB); (2) Second Priority: Administrators; (3) Third Priority: Registered Users, and (4) Fourth Priority: Authorized Users. If there are multiple administrators for a primary or sub-DMB, the Super administrator can assign certain rights to each administrator such as:

a) Can this Administrator setup sub-DMBs: Yes/No b) Can this Administrator block content from being transmitted to certain sub-DMBs: Yes/No c) Should 'Common Digital Mail' not addressed to any registered user be forwarded to this Administrator: Yes/No d) Should certain categories or types of mail be forwarded to this Administrator: Yes/No.

All such rights assigned to each administrator shall be maintained within the 'Profile' section of the primary and/or sub-DMBs.

It is contemplated that the DMB system will create only one DMBA for each mailing address throughout a prescribed region (e.g., global) and only one primary DMB corresponds to each DMBA. In other words, each primary DMB shall have one-to-one mapping to a DMBA within the DMB system. However, any number of sub-DMB(s) can be created for each primary DMB and one or more persons may be permitted access to the same primary and sub-DMB(s), as described below. Similarly, a registered or authorized user may have access to many different primary and sub-DMB(s) and any of these registered or authorized users may be designated as an administrator for the primary and one or more sub-DMBs. Setting up administrator(s) for the primary and sub-DMBs shall be optional.

Herein, the formulation and configuration of different types of DMBs, most notably a primary DMB and sub-DMB(s) for a residential address, is described herein. The DMB system creates only one primary DMB for that mailing address. If there are multiple persons living at that residential address, all of them can register and access all incoming digital mail messages directly from the primary DMB or anyone or more of them can choose to create a sub-DMB for themselves or the administrator can create a sub-DMB for one or more registered users. The DMB system is configured to support one primary DMB for that mailing address and at least one sub-DMB for each registered user living or working in that mailing address. Herein, the administrator(s) or registered user(s) can authorize or grant permission to other registered users to access their DMB, change or delete access to other registered users of their primary & sub-DMB(s) anytime for changes such as birth, death, move to new location or any other reason, by providing proper documentation.

In one embodiment of the invention, all users who have access to a DMB may be listed and displayed within the profile section of a DMB so all users can see who are the registered users, authorized users, who were granted access by who, who are the administrators/super administrators etc. This enables the users to dispute access controls if they believe certain access to the DMB was achieved by fraud or by mistake.

Herein, the formulation and configuration of different types of DMBs, most notably a primary DMB and a sub-DMB for a commercial address, is described herein. As an illustrative example, the primary DMB is directed to a business entity with 1000 employees working in the office building. The DMB system is configured with one primary DMB for that office building's mailing address. The business entity can register with the DMB system and setup one or more registered users, administrators and a super administrator for the primary DMB. The administrator(s) for the primary DMB can give rights/access to all or select employees to access the primary DMB and/or setup their own sub-DMB(s). The administrator(s) for the primary DMB can also setup sub-DMB(s) for different departments such as HR, Marketing, Sales, IT, Finance, Operations, Accounting, or the like. One or more individuals within each department can be setup as an administrator for that sub-DMB or just given the rights to access the content associated with that sub-DMB. Each department can further setup as many sub-DMB(s) as they choose one for each registered user. Under this embodiment, the DMB system may create only one sub-DMB for each registered user within a primary DMB. Also, the administrators can add/change/delete the registered users of the primary DMB and/or sub-DMB(s) anytime for changes such as change of ownership, move to new location, change of employees, or other reasons.

Referring still to FIG. 3, after profile setup, the registered users are prompted to set up distribution rules for the primary DMB and each of the sub-DMBs (operation 340). Herein, according to one embodiment of the disclosure, the distribution rules may be directed to creating sub-folders associated with the primary DMB and sub-DMBs. Furthermore, the distribution rules may be configured to (i) forward certain categories or types of digital mail or from specific senders to one or more registered or authorized users, (ii) forward incoming digital mail to another primary DMB; and/or (iii) issue a notification message (e.g., text, email, etc.) to a recipient of the digital mail.

V. Digital Mail Routing Scheme

A. Rules for Routing/Distribution of Incoming Digital Mail

Figure 4:
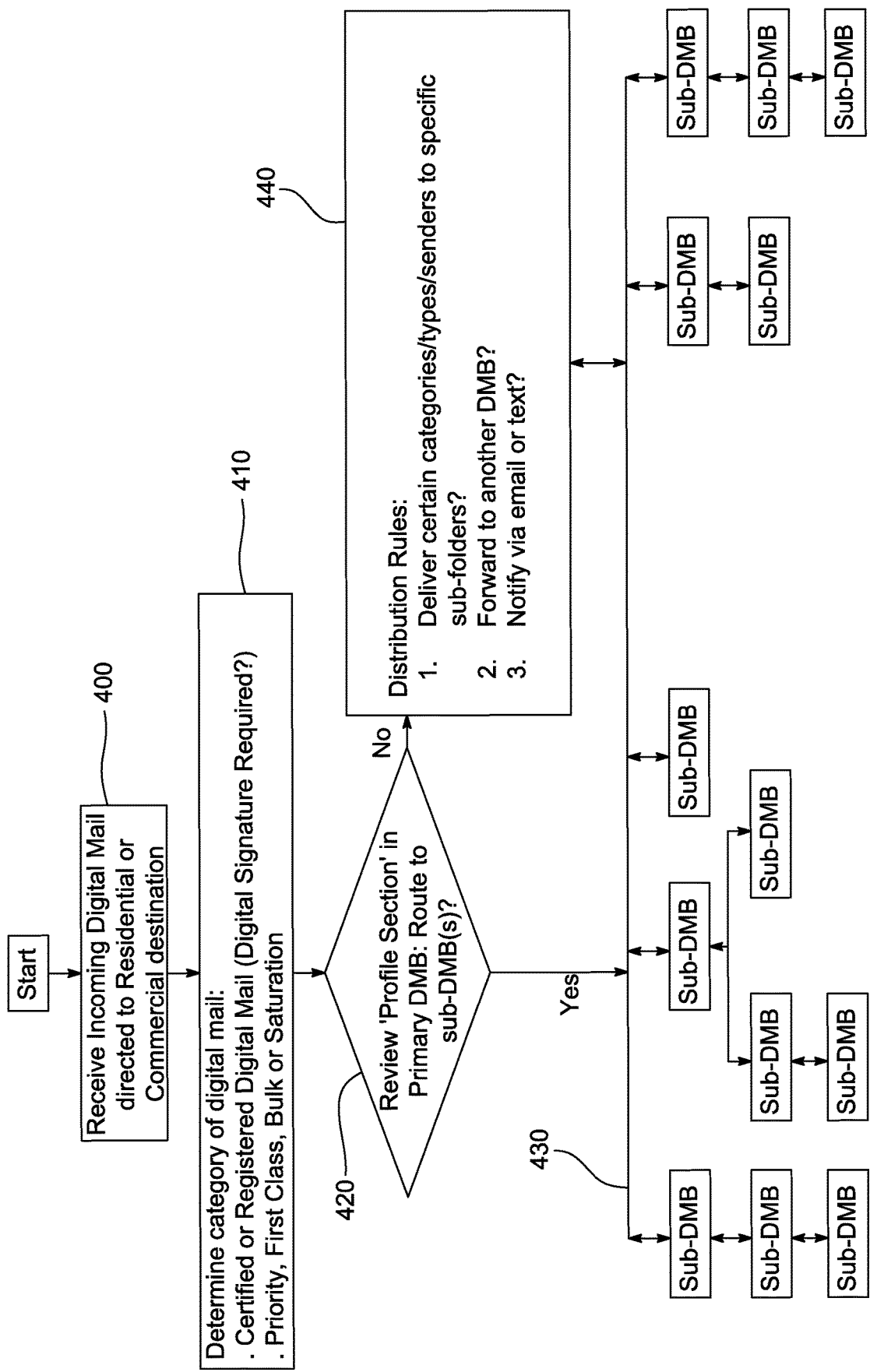
FIG. 4 is an exemplary embodiment of a flowchart pertaining to the routing of content associated with an incoming digital mail message to a DMB associated with a residential or commercial destination.

Referring to FIG. 4, a flowchart of the routing of content associated with an incoming digital mail message directed to a residential or commercial destination is shown. Herein, upon receipt of the incoming digital mail message (operation 400), analytics are conducted on content of the incoming digital mail message by logic within the DMB system. The analytics (hereinafter, "first analytics") is conducted to determine a type and/or category of the incoming digital mail message (operation 410). For example, the category assigned to the incoming digital mail message may include, but is not limited or restricted to (i) registered digital mail, (ii) certified digital mail, (iii) priority digital mail, (iv) first class digital mail, (v) bulk digital mail, (vi) saturation, as described below.

1. Registered & Certified Digital mail: When the digital mail message is assigned this category, the DMB system may require the recipient to digitally sign a 'registered' and/or 'certified' digital mail message before permitting the digital mail message to be opened.

2. Priority & First-Class Digital Mail: When the digital mail message is assigned this category, all 'priority' and 'first class' digital mail may be routed (delivered) to 'priority' and 'first class' digital mail folders. Priority and first-class digital mail may be displayed on the top of their DMB and highlighted. The DMB system may create additional sub-folders within 'first class' digital mail folder such as bills/invoices, checks, bank/credit card statements, etc. Hence, delivery of the incoming first-class digital mail message to a respective sub-folder may be based on how the sender 'tagged' the digital mail message.

3. Bulk Digital Mail: When the digital mail message is assigned this category, the DMB system delivers all of the digital mail to respective folders/sub-folders corresponding to the content type (e.g., marketing digital mail, junk digital mail, etc.).

4. Saturation: When the digital mail message is assigned this category, the DMB system can provide a multicast or broadcast delivery of digital mail to all mailing addresses within a specified area such as a city, zip code or a neighborhood.

Alternatively, instead of creating a separate folder for each category as described above, all incoming digital mail from all categories may be displayed within an inbox. The inbox might have a separate column titled 'Category' and denote a letter such as 'R for Registered', 'C for Certified', 'P for Priority', 'F for First Class' 'B for Bulk' and 'S for Saturation' digital mail so the recipient knows the category of digital mail received in their inbox. Similarly, the inbox might have another column titled 'Type' and denote a letter such as 'M for Marketing', 'B for Bills', 'C for Credit Card', 'S for Sale', 'C for Coupons', 'D for Deals' etc., so the recipient knows the type of digital mail received in their inbox. Note that the "Category" and "Type" are selected by the sender while sending the digital mail.

The first analytics may include determining, based on the determined category associated with the incoming digital mail message, whether that digital mail message requires a certification of delivery and receipt by a particular user (certified digital mail). The certified receipt may require a digital signature from an intended recipient. Also, the first analytics may be conducted to determine a delivery priority for the incoming digital mail message, where the delivery priorities may be provided as multiple levels (e.g., priority levels reminiscent of priority, first class, bulk or saturation digital mail).

Thereafter, as further shown in FIG. 4, logic within the DMB system determines whether the incoming digital mail message should be routed to one or more sub-DMB(s) instead of a primary DMB (operation 420) For instance, as an illustrative example, the 'Profiles' section within each DMB may contain a list of all registered users, authorized users and/or administrators, which of those registered users have a sub-DMB and what types of incoming digital mail message should be filtered through the AI process or blocked (if applicable) from which sub-DMB, etc. The logic within the DMB system may route the incoming digital mail message to the appropriate sub-DMB(s) (operation 430) based on the optional address fields contained within the incoming digital mail (as explained later), transmission rules & routing instructions in the Profiles Section.

If there are no sub-DMBs or if the incoming digital mail message is not being routed to another sub-DMB, then the DMB system logic is configured to conduct a second (distribution rule) analytics (operation 440). The second analytics may include an analysis of the distribution rules contained within a recipients DMB (primary DMB and/or sub-DMB) to determine a delivery destination for the incoming digital mail message (e.g., another primary DMB and/or sub-DMB). The distribution rules may be determined by the registered users of the primary or sub-DMB(s). Examples of the distribution rule analytics may include, but are not limited or restricted to (i) confirming digital mail classification for delivering junk digital mail to a trash folder in primary or sub-DMB; (ii) deliver certain categories, types or content or incoming digital mail message from certain senders or certain 'tags' to specific user created folders or sub-folders; (iii) automated forwarding of the incoming digital mail message to another DMB; and/or (iv) user notification based on receipt of the incoming digital mail message, or the like.

More specifically, the administrators, registered users and/or authorized users can create (setup) profiles, transmission rules and the routing instructions for all incoming digital mail for each primary and sub-DMB(s). Herein, the profiles within each DMB (primary and sub-DMB) may include (i) a list of all registered users, administrators, authorized users, which of those registered users have a sub-DMB(s), (ii) what type/sender/categories of incoming digital mail should be routed to which sub-DMB, (iii) what type/sender/content should be retained within the primary DMB, and (iv) what type/content/sender should be blocked from which sub-DMB etc. After the profile is established during the registration process, the identified administrator(s), registered and authorized users of a primary DMB(s) and/or any corresponding sub-DMB(s) can (i) control distribution of incoming content (e.g., determine what type of content should be blocked from which DMB), and/or (ii) determine the transmission rules (e.g., direct certain types, senders or categories of incoming digital mail to be routed to certain DMBs).

The DMB system may be configured to route the incoming digital mail based on information contained within the profiles section of primary and/or sub-DMBs. For example, incoming digital mail may be routed to the respective primary DMB or sub-DMB(s) as per the transmission rules & routing instructions in the profiles, such as: (1) routing to the primary DMB only; (2) routing to the primary DMB and then re-routing to the sub-DMB(s); (3) routed directly to each sub-DMB; (4) certain types or content of incoming digital mail for children below certain age may be blocked from children's sub-DMB(s); and/or (5) certain types, content, categories or from specific senders may be retained within the primary DMB or routed to certain sub-DMBs.

1. Illustrative Digital Mail Routing—Residential

As an illustrative example, if there are 4 people (first parent, second parent, adult child and minor child) living at the digital mailbox address operating as a residential address, the access control and routing schemes associated with the DMB can be configured in accordance with a number of access control and routing schemes. For instance, only the parents may have access to the primary DMB associated with the digital mailbox address. Additionally, only the parents may be setup as administrators. An adult living with the parents may be registered and given access to the primary DMB and/or setup a sub-DMB so that all incoming digital mail in his/her name can be delivered directly to his/her sub-DMB. Also, one of the administrators can control transmission of incoming digital mail to the minor child to block certain types of incoming digital mail from being delivered to the child's sub-DMB.

As another illustrative example, if four (4) adults are sharing an apartment, the roommates can setup their primary and sub DMBs for the digital mailing address associated with the apartment in accordance with many different access control and routing schemes. For instance, all four (4) roommates may be setup as administrators while all four of the roommates have established their own sub-DMBs. The incoming digital mail from certain senders/types/categories may be retained within the primary DMB or routed to a sub-DMB. For instance, utility bill or an invoice from a specific sender may be retained within the primary DMB even if it is addressed to one of the four roommates, so that all four roommates can access the information in the primary DMB. Alternatively, certain categories, types, content or incoming digital mail from specific senders can be copied and routed to one or more registered users per transmission & routing rules setup in the profiles section.

2. Illustrative Digital Mail Routing—Commercial

According to one embodiment of the disclosure, a business entity can setup the profiles and routing instructions for all incoming digital mail addressed to a digital mailbox address associated with a primary DMB and/or sub-DMB(s). As an illustrative example, if an office building with one mailing address has 1,000 employees and 3 different departments (Legal, Finance & HR), the super administrator or administrator(s) of the primary DMB can setup a sub-DMB for each of the three departments, administrators for each of these sub-DMBs and setup the profiles and routing instructions for incoming digital mail. In particular, the profile section may be configured to include a list of all registered users, authorized users, and/or administrators for the primary DMB and/or sub-DMB(s) associated with the primary DMB. For this deployment within a commercial setting, only certain administrators and/or registered users may be given access to information in the primary DMB. The administrators of each department sub-DMB can setup additional sub-DMBs within their department such as Finance department can setup sub-DMBs for Accounts Receivable, Accounts Payable etc. All incoming digital mail messages for that department shall be routed/delivered to the respective sub-DMBs. Herein, the administrator(s) for each department sub-DMB can setup a sub-DMB for each employee within their department or give permission to all or specific employees in their department to setup their own sub-DMB(s). Similarly, all employees can be given permission to setup their own sub-DMB(s) and all incoming digital mail messages with the authorized/registered employees name and office address may be routed/delivered directly to that employee's sub-DMB. Under one embodiment of this invention, one user can be registered under multiple DMBs and sub-DMBs, but the same user can be registered under only one sub-DMB within the same primary DMB.

According to one embodiment of the disclosure, all profiles (including administrators/registered/authorized users, transmission rules & routing instructions) may be maintained within the primary DMB(s) and the distribution rules may be maintained at both primary & sub-DMB(s). More specifically, profiles of all administrators, registered and/or authorized users of a primary DMB and/or any sub-DMB(s) may be maintained within the primary DMB. The profile may identify (i) registered, authorized users and/or administrators by name(s) and qualifying information such as company of employment, department, title, or the like; (ii) which registered users have sub-DMB(s); (iii) what category/types/senders/content of incoming digital mail should be routed to which sub-DMB, what type/content/category/sender should be retained within the primary DMB; (iv) what type/content/category/sender should be copied and sent to which sub-DMBs (multiple DMBs); and (v) what category/type/content/senders of digital mail should be blocked (if any) from routing to certain sub-DMB(s) (such as adult content or digital mail from specific senders).

Similarly, the distribution rules may be determined by each registered user on how/where their incoming digital mail should be delivered within their primary or sub-DMB. For instance, the distribution rules may be directed to (i) the delivery of certain types/categories/content or from specific senders to assigned sub-folders, (ii) the sending of notifications for certain types/categories/content of digital mail via text or email, (iii) the forwarding of certain types/categories/content of digital mail to another DMB or text or email, (iv) hold their digital mail for vacation, or the like.

In one embodiment of the disclosure, it is contemplated that only the administrators and/or registered users of the respective DMB(s) may have access to the profile section. All incoming digital mail may be routed to the respective DMB(s) based on the transmission rules and routing instructions given in the profiles maintained within the primary and/or sub-DMB. In contrast, the distribution rules may be determined by each registered user. Each registered user who has their own DMB or sub-DMB may decide what they want to do with their incoming digital mail message such as notifications, forward digital mail to another DMB, move certain types of digital mail to sub-folders such as move junk mail to trash folder or the like.

B. Rules for Routing/Distribution of Outgoing Digital Mail

Figure 5A:
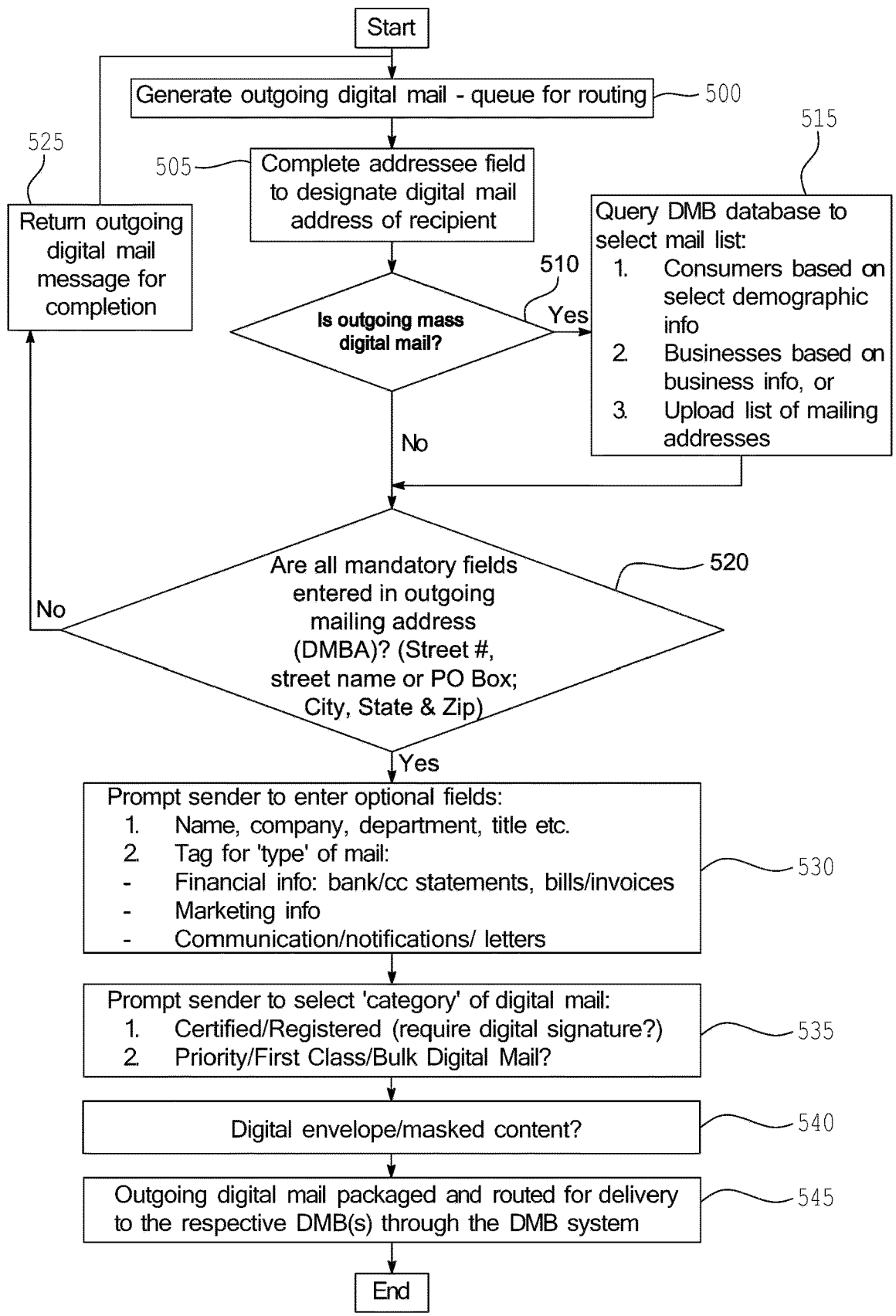
FIG. 5A is an exemplary embodiment of a flowchart pertaining to the routing of content associated with an outgoing digital mail message provided to the DMB system and queued for processing.

Referring to FIG. 5, a flowchart of the routing of content associated with an outgoing digital mail message provided to the DMB system and queued for processing is shown. Herein, when activated, a DMB application instance is configured to generate an outgoing digital mail message that includes an addressee field for routing (operation 500). The addressee field is adapted for the sender to either (i) select or enter the digital mailing address of an intended recipient (e.g., the physical address) for peer-to-peer communications for the digital mail, or (ii) select a displayable element that generates a query to the DMB database to generate a list of digital mailing addresses or upload the digital mailing list for use in broadcasting digital mail to users (e.g. businesses and/or consumers) included on the digital mail list (operations 505, 510 & 515). These operations are representative of sending one or more digital mail messages or a mass mailing campaign.

A first analytics is conducted on content of the outgoing digital mail message to determine that all mandatory fields for the outgoing digital mail message have been entered (block 520). If all of the mandatory fields have not been entered, the outgoing digital mail message is returned to complete entry of at least certain mandatory fields needed for routing of the outgoing digital mail message to one or more primary DMBs (block 525).

Herein, according to one embodiment of the disclosure, the "mandatory fields" is content that is used for the transmission of digital mail from a sender's DMB (e.g., primary or sub-DMB) to an intended recipient's primary DMB(s). For outgoing digital mail, certain fields, such as the digital mailbox address representative as a physical address associated with the intended recipient for example, are mandatory. For example, PO Box address, street number and name, apartment/unit/suite number, geographic region (e.g., city, state, zip code) may be mandatory. The content associated with other fields such as an identifier of the recipient (e.g., first name, last name, company name, department, title, attention, care of, etc.) may be optional. The optional fields may be used for routing of digital mail to primary or sub-DMB(s) based on profiles and routing instructions given by registered users.

Note that an email address generally features a single line of content consisting of a username, an "@" sign, and a URL/domain name (johndoe@gmail.com). In contrast, the DMB system, in the outgoing digital mail, features multiple content lines without an '@' sign or URL or domain name that utilizes the physical address such as the following:

i. First Name, Middle Name, Last Name, Suffix (optional)
ii. Title (optional)
iii. Company Name (optional)
iv. Department (optional)
v. Street Address Line 1: Street #, Street name or PO Box (mandatory)
vi. Street Address Line 2: Locality/Community/Neighborhood (optional in USA—may be mandatory in some countries/regions)
vii. City, State & Zip code (mandatory)
viii. Country and/or country code (mandatory for International Digital Mail)

The table below is an example of a layout/structure of outgoing digital mail section within DMB system for transmission of data to a DMB based on mailing address with a copy & blind copy to other DMBs based on their mailing addresses:

| Description | Send To | Copy To | Blind Copy |
|---|---|---|---|
| Optional Fields (first name, middle name, last name, title, department, company etc.- one line/row for each) | | | |
| Mandatory Fields (line 1: street number & name; line 2: street number & name; line 3: city; line 4: state; line 5: zip | | | |

Where the mandatory fields for the outgoing digital mail message have been completed, the system prompts the sender to complete certain optional fields such as the intended recipients name, title, company, department etc., and also optionally tag the outgoing digital mail for type of digital mail, such as financial, marketing, communication etc. (block 530). The DMB system also prompts the sender to select the category of outgoing digital mail such as certified/registered (is digital signature required?), priority, first class, digital envelope/masked content etc. (blocks 535 & 540). The outgoing digital mail message is routed to the primary DMB or perhaps multiple primary DMBs (block 545). Independent of the routed destination (primary DMB, sub-DMB), the outgoing digital mail message may be analyzed for type and/or category, in which tags may be set pertaining to routing and/or access controls for the content of the outgoing digital mail message prior to transmission to the primary DMB and/or sub-DMB(s) as illustrated in blocks 530 and 535.

In one embodiment of the invention, the outgoing digital mail may be routed first to the recipient's primary DMB based on the mandatory fields, and then re-routed to the recipient's sub-DMB(s) based on optional fields according to the profiles and routing instructions given in the respective primary and sub-DMB(s). In another embodiment of the invention, the profiles, routing instructions and distribution rules from each primary and sub-DMB may be uploaded to the DMB system virtual private cloud to facilitate routing/distribution of digital mail directly to the respective primary and/or sub-DMB(s) for easier access and faster execution (see FIG. 9A). Note that the flow of digital mail within the DMB system and the system architecture can be designed in many different ways to ensure the incoming and outgoing digital mail messages are routed and distributed securely and expeditiously to the respective primary and/or sub-DMB(s).

Since every mailing address has a corresponding DMBA in this DMB system, the outgoing digital mail (including attachments, if any) is sent from the sender's DMB to one or more recipients' DMBA(s) specified by the sender through this DMB system and routed/delivered to the DMB(s) corresponding to the DMBAs.

Note that all transmission of data over the public cloud network from a sender to a recipient under current technology and systems is based on email address, URL, FTP, TCP/IP connectivity or a link shared between the parties to upload/download information to/from the cloud. There is no system in place today to transmit data over the public cloud network based on mailing address or without an email address or without a link shared between the sender and the recipient or without an @ sign, domain or URL. Since DMB system is a private network that includes all mailing addresses (DMBAs) available globally and all primary DMBs are mapped 1-to-1 to the respective DMBAs, transmission of data between DMBs within the DMB system's VPC (virtual private cloud network) becomes a simple and easy peer to peer communication process.

In particular, when a registered user logs in to DMB application instance, the DMB system is being accessed. The registered users are provided access to enter or select a DMBA that has a one-to-one mapping to a corresponding DMB. Thereafter, an outgoing digital mail (including attachments, if any) may be routed to the appropriate DMB through the DMB system using the mailing address (DMBA).

Figure 5B:
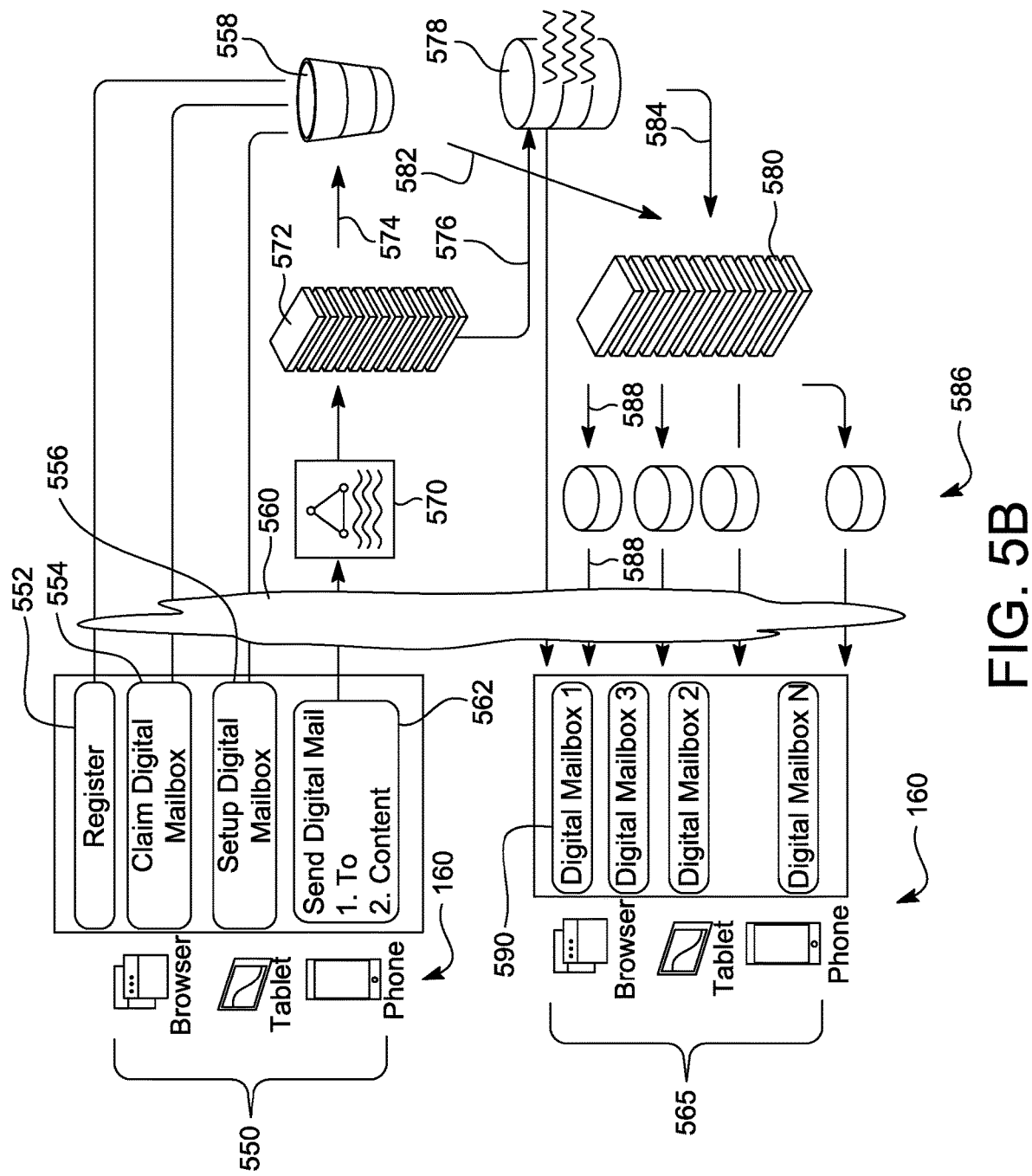
FIG. 5B is an exemplary embodiment of a logical architecture of the DMB system and a routing of content therein.

Referring now to FIG. 5B, a logical representation of the DMB system architecture supporting the routing of digital mail messages is shown. Herein, a sender 550 (e.g., any one of a plurality of computing devices 160) performs a registration process 552 (described above) prior to claiming rights/access to a primary digital mailbox 554. Thereafter, the user conducts a digital mailbox setup process 556 to configure profiles, transmission rules & routing instructions for the primary DMB and/or any sub-DMB(s)). These communications are conducted with a data store 558 accessible within a cloud network 560 (e.g., one or more private cloud networks organized by region), where the data store 558 may operate as a relational database including metadata, configuration data and user profiles, transmission rules, routing instructions, distribution rules etc. for each DMB.

Thereafter, a digital mail message 562 may be sent to a selected destination 565 (e.g., a digital mailbox associated with another one of a plurality of computing devices 160). More specifically, the digital mail message 562 is sent to a messaging server queues 570 and then transmitted to one or more incoming web servers 572, which accesses and references registered user information & profiles 574 stored in database 558. The web servers generate receiver nodes and creates metadata entries 576 and stores the digital mail in data lake 578. The digital mail 562 is then packaged and routed from data lake 578 by accessing user information stored in database 558 to outgoing web servers 580 via 584 for processing. The outgoing web servers 580 are communicatively coupled to the data store 558 and the data lake 578 to receive metadata entries 576 and user information 582 to identify and provide context to the digital mail message 562. Thereafter, the outgoing web servers 580 is configured to schedule invocation of tasks that control delivery of an alert 588 (e.g., linked message) to an identified DMB 590 pertaining to the destination. Upon selection of the linked message, the digital mail message 562 is provided for playback using cache and metadata descriptors 586 for faster access & execution

VII. Digital Mail Routing Features of the DMB System

A. Tags & Sub-Folders

Figure 6:
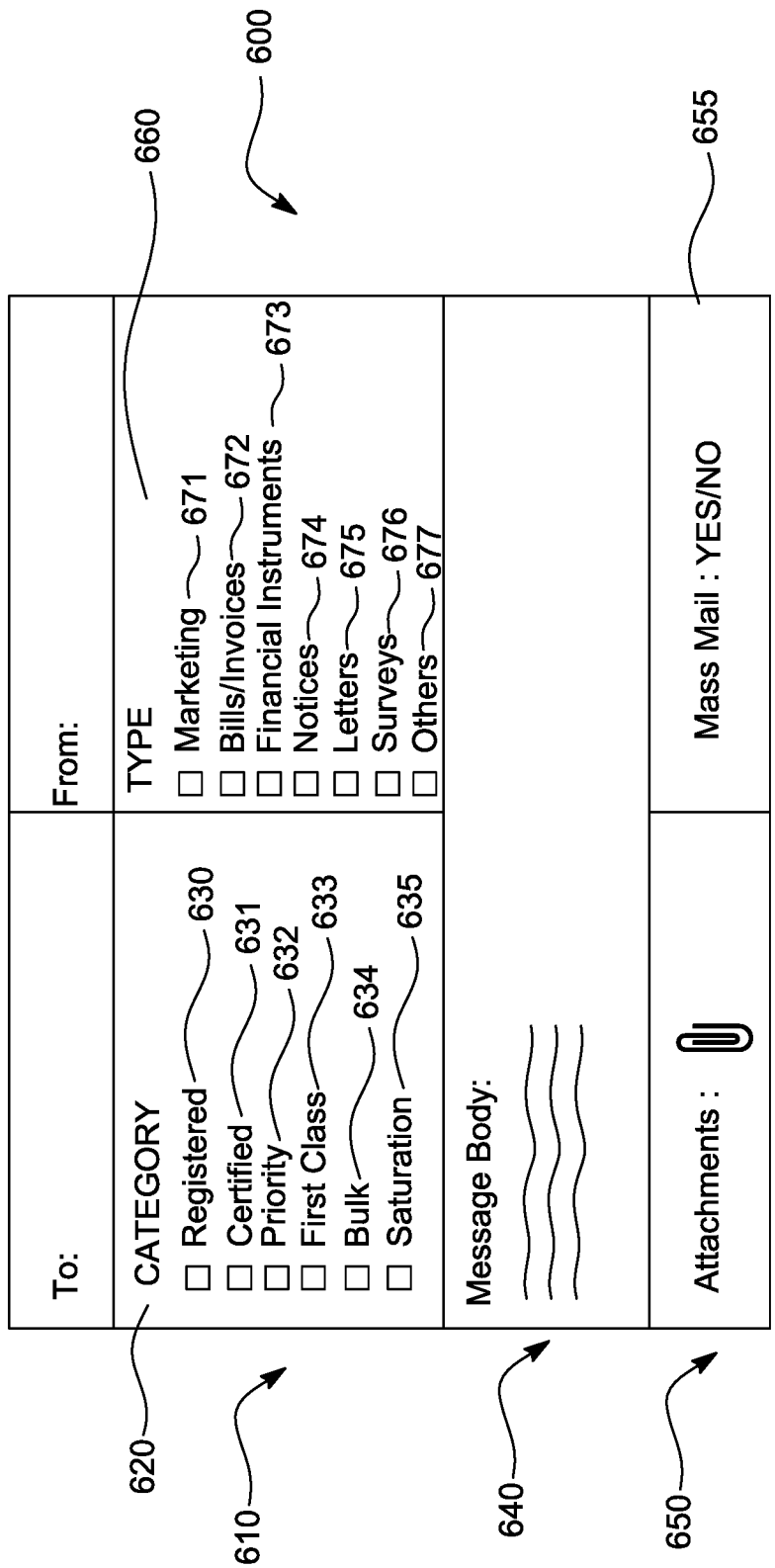
FIG. 6 is an exemplary embodiment of a logical representation of the digital mail message for transmission to a primary DMB or sub-DMB.

Referring to FIG. 6, an illustrative embodiment of a logical representation of the digital mail message 600 for transmission to a primary DMB or sub-DMB is shown. Herein, it is contemplated the DMB system may prompt the sender to select the category of the digital mail message 600. In particular, each outgoing digital mail message may be identified by its category 620 (e.g., registered 630, certified digital mail 631, priority 632, first class 633, bulk 634, or saturation 635). The selection of the category 620 may assist in identifying a quality of service (QOS) level for the digital mail message 600 along with computing a cost associated with its transmission. Where none of the category tags 630-635 are select, the DMB system may denote a transmission error and prompt the sender to select the category 620 prior to transmission of the digital mail message 600. Alternatively, the DMB system may automatically categorize the digital mail message 600 based on interpreted content within a message body 640 or its identifier (e.g., name, extension type, etc.) and/or mass mail 655 or content of one or more attached documents 650 (through AI or ML analysis of the content). As a default, the DMB system may assign the digital mail message 600 to a selected category (e.g., first class 633).

Similarly, the DMB system may prompt the sender to optionally tag the outgoing digital mail based on its message type 660. The message type 660 may include, but is not limited or restricted to the following: marketing 671 (sale items, coupons, offers, deals, discounts, solicitations, etc.); bills/invoices 672; financial instruments 673 (e.g., checks, etc.); notices 674; letters 675; surveys 676, or other message types 677. The specific message type 660 may be used in computation of the transmission costs for the digital mail message 600 as well as adjustment of QoS levels associated with the digital mail, especially if a tier-based registration is utilized in which different registration tiers provide guarantees of different QoS levels.

Besides the tags being used to control message transmission, the DMB system may also use the tags 610 to automatically direct and/or create one or more sub-folders within a primary DMB and/or sub-DMB(s) to which the digital mail message 600 is directed. Where a corresponding sub-folder identified by category or content type has already been created, the digital mail message 600 is routed to that sub-folder as tagged by the sender.

Of course, registered users are provided the ability to manually create sub-folders in their DMB in-box and out-box to keep their (virtual) digital mailboxes organized. Registered users can also setup distribution rules for incoming digital mail based on tags (category or type) and/or senders of digital mail and instruct the DMB system to automatically move those digital mail to the respective sub-folders.

B. Mass Mailing/Search Functions

Figure 7:
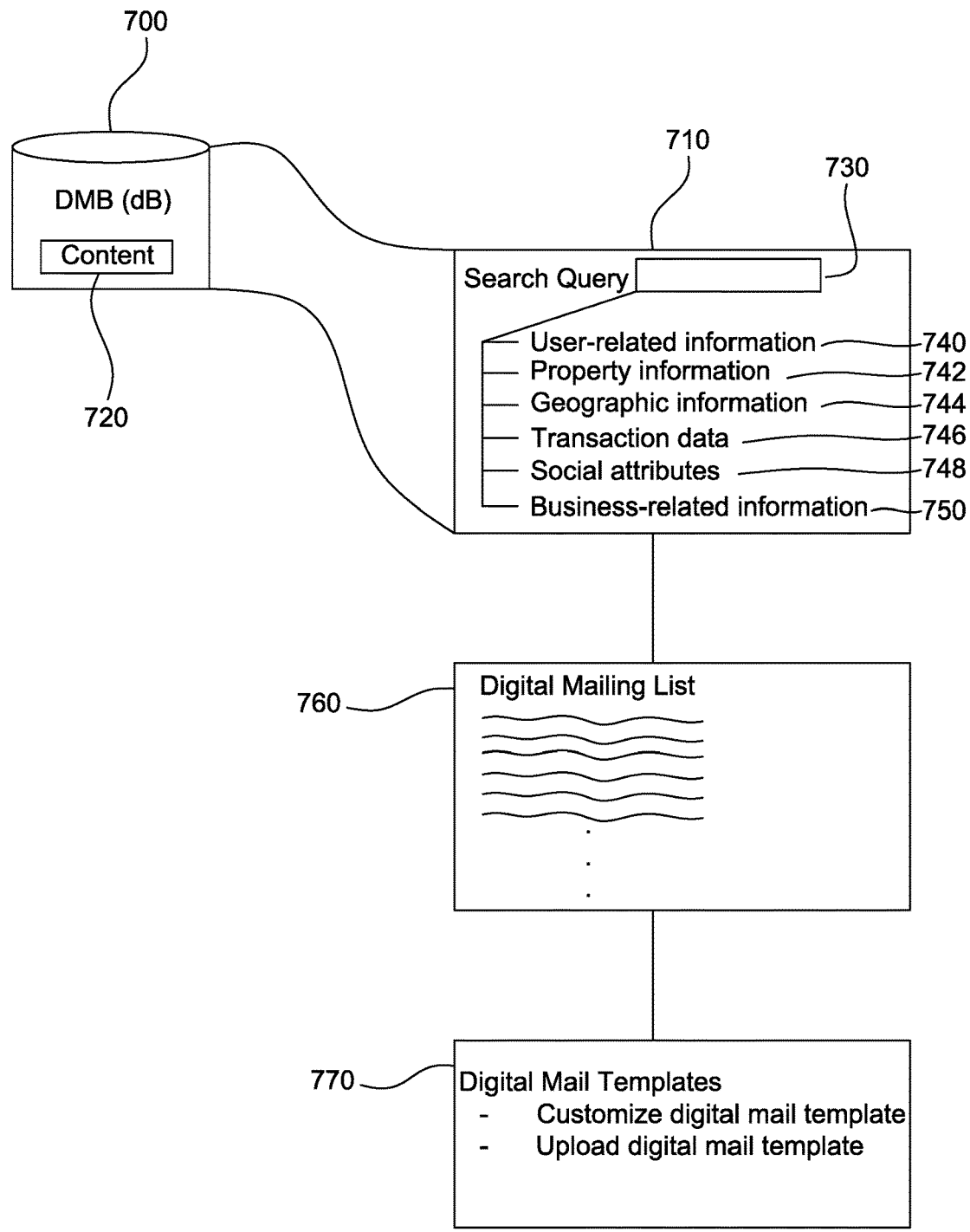
FIG. 7 is an exemplary embodiment of a logical representation of a search function that is useful for data gathering as needed for mass digital mailing.

Referring now to FIG. 7, an illustrative embodiment of a logical representation of a search function that is useful for data gathering as needed for mass digital mailing is shown. Typically, business may conduct mass digital mailing campaigns that are concentrated on all properties (e.g., residential homes, businesses) within certain neighborhoods, communities, zip codes or cities. Alternatively, mass digital mailing campaigns may target specific consumers/businesses in certain geographic areas based on demographic information such as age, income, education, revenues, size of company, # of employees etc., based on their marketing objectives. The DMB system 100 of FIG. 1 is configured to access various third-party databases to acquire information directed to each DMBA associated with a physical (mailing) address for storage within one or more DMB system databases 700, as shown.

The DMB system database 700 operates as a searchable database. Through use of a GUI (Graphical User Interface) 710 generated by networking logic 115 within the DMB system (see FIG. 1), a sender is provided access to stored content 720 within the DMB system database 700. The stored content 720 may include information associated with individuals and/or businesses operating as registered (or authorized) users with assigned DMBAs, where the information is accessible using various search criteria 730. The search criteria 730 may include (i) user-related information 740 (e.g., age, gender, ethnicity, income range, education, profession); (ii) residential property information 742 (e.g., type of residence such as apartments, single family homes, etc.); (iii) geographic search parameters 744 (e.g., "find all single-family homes with income>$100 k within 5 mile radius"; (iv) transaction data 746 (e.g., find all consumers who bought an electric vehicle or baby products within a prescribed time period, (v) social attributes 748 (e.g., find all consumers who like basketball or belong to certain groups or play video games), and/or (iv) business-related information 750 (e.g., type of business, industry classification code, business revenue, number of employees, etc.).

Upon selection and/or uploading of mailing addresses (DMBAs) of intended recipients, the DMB system may prompt the sender to create or upload a 'digital mail template' to be used for mass mailing 770. It is contemplated the DMB system may have many pre-designed digital mail templates to choose from or the registered users can create/customize their own using the digital mail template module within the DMB system or upload their own digital mail template. The sender can attach any file of their choice and submit their completed digital mail template for processing their outgoing digital mail to their intended recipients.

When a sender is searching or inputting one or more mailing addresses, the DMB system may produce a displayable list 760 based on their search criteria to facilitate selection of correct/intended recipient(s). The DMB system database 700 may support auto-correct functionality, where names and/or addresses are modified based on stored content to ensure the sender is inputting the correct information.

Businesses and registered users can search, find and select a list of mailing addresses (DMBAs) from DMB system database 700 or upload a list of mailing addresses into the DMB application instance for mass transmission of digital mail message to selected DMB(s). Senders can send the digital mail and/or attachments as password protected files or require the recipients to enter their mailing address or some other form of ID/verification (such as sending a code via text or email) before opening the digital mail. For mass marketing digital mail that does not have customized content by resident or business, the DMB system may just display the "senders name" and "subject line in the inbox" without transmitting the detailed content. When the recipient clicks on that digital mail, the DMB system may present, display and/or download the content of the digital mail. Since a small fraction of recipients will actually view or open the mass marketing digital mail, this commonly used methodology improves network latency and significantly minimizes the volume of data transmitted and stored.

C. Change of Address & Forwarding Digital Mail

Currently, when consumers or businesses move from one location to another, the postal service is notified of the change of address and the postal service forwards all incoming mail to their new address for a prescribed period of time. Similarly, registered users may access the DMB system for notification of their move (i.e., transition from prior mailing address to current mailing address) so that incoming digital mail messages will be forwarded from a prior DMB to a new DMB.

Figure 8:
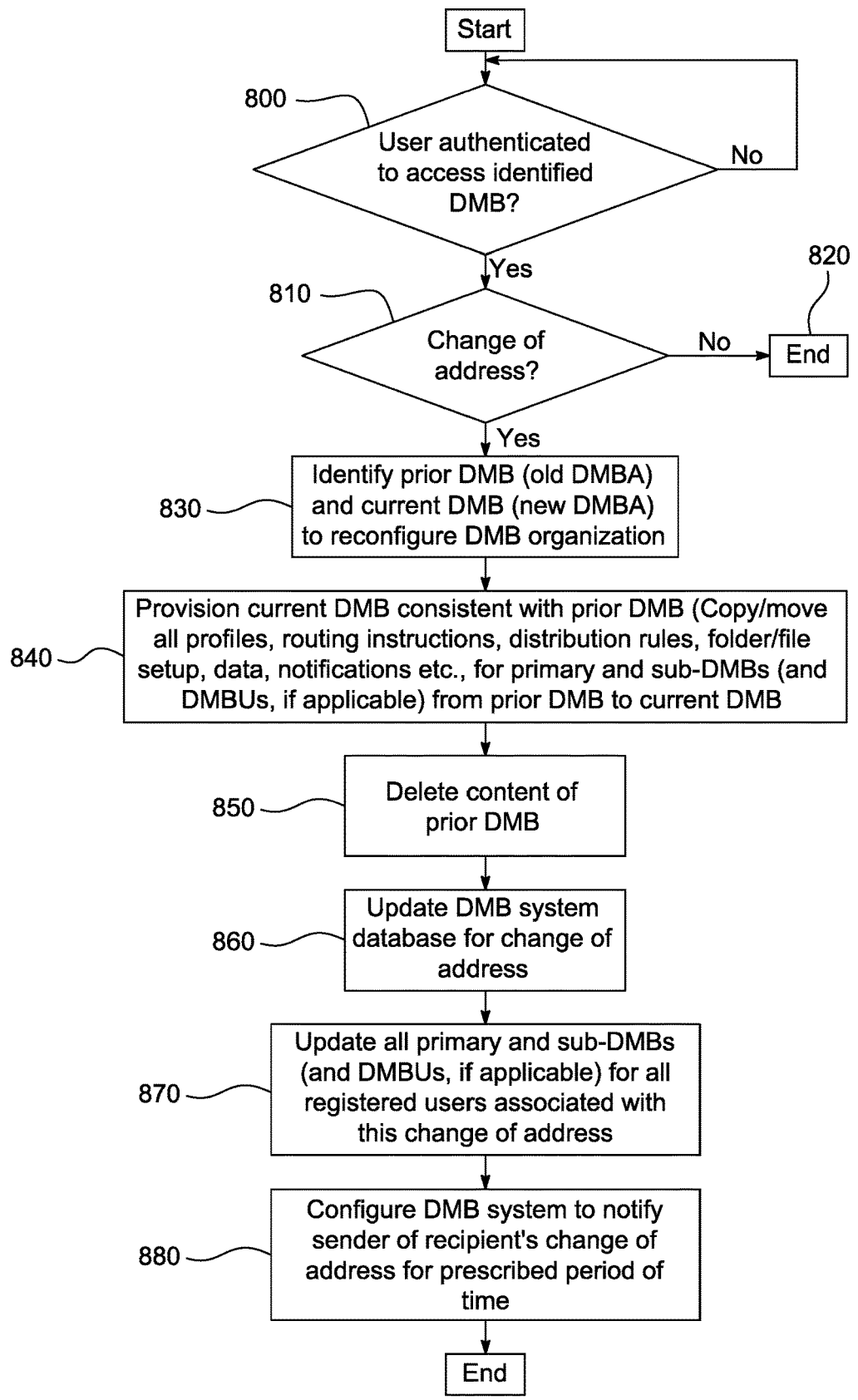
FIG. 8 is an exemplary embodiment of a logical process for updating the DMB system to account for changes of address by a registered user.

More specifically, as illustrated in FIG. 8, an embodiment of a logical process for updating the DMB system to account for changes of address by a registered user is shown. Herein, after the user has been authenticated (e.g., login and verified to access the DMB), the DMB system provides a registered user with an ability to change his or her digital mailbox address that comports with a change in the physical address of the registered user (operations 800 and 810). If there is no change of address, the logical process completes (operation 820). Otherwise, the logical process performs operations to transition from the prior DMB to the new DMB (operation 830). During this logical process, the current DMB is configured in a manner consistent with the prior DMB.

Therefore, the current DMB undergoes a set-up process consistent with provisioning the current DMB to be consistent with the DMB associated with the prior mailing address (operation 840). During the set-up process for the current DMB (DMBA corresponding to new mailing address), content from the prior DMB (DMBA corresponding to the old mailing address) is retrieved to provision the current DMB. In particular, the current DMB is provisioned with the same profiles, transmission rules, routing instructions, distribution rules, folder/file setup, notifications and/or settings as utilized by the prior DMB. Additionally, the primary DMB and sub-DMB constructs for the prior DMB are replicated as the primary DMB and sub-DMBs for the current DMB.

After transferring content from the prior DMB to the current DMB, all content maintained in the prior DMB is deleted (operation 850). Also, the DMB system database is updated to denote that the registered users are now associated with the current DMB thereby recording the change of address for those registered users (operation 860). This process is repeated for any additional primary DMB(s), sub-DMB(s) and/or DMBUs associated with each registered user (operation 870). Thereafter, when a sender is sending a digital mail message to someone who has moved, the DMB system may notify the sender about the change of address and automatically send the digital mail message to the correct DMB (operation 880).

In one embodiment of the invention, where a registered user A who moved to a new location (e.g., a multi-family dwelling unit with multiple roommates) is unable to provide "proof of address" for the new address because his/her driver's license may have the old address and the apartment lease/utility bills may be in another roommate's name etc., the registered user A can send a request to an administrator or another registered user of that multi-family dwelling unit to grant him/her permission to have access/rights to the new DMB. Such permissions may be granted by an existing administrator or registered or authorized user of that DMB temporarily for a short term until the new roommate (registered user A) is able to provide "proof of address" for the new DMB. It is contemplated that every registered user's "identity" and "proof of address" shall be verified and authenticated in order to maintain the integrity and reliability of the DMBS.

In summary, the DMB system database may be updated practically in real time for all changes such as change of address, birth, death, change of name (such as when they get married), change of business ownership, change of employees, or the like. In accordance with one embodiment of the disclosure, the DMB may be assigned to and potentially one-to-one mapped with the DMBA. Only the registered users who have access to the primary DMB and/or one or more sub-DMBs for the old and new physical (mailing) address may change access based on the consumers and businesses who moved from one location to another. Registered users who moved may no longer have access to their old primary DMB and sub-DMBs. Instead, these users may be given access to the primary DMB and sub-DMBs that correspond to their new physical (mailing) address. It is appreciated that, in accordance with this embodiment of the disclosure, the DMB may be assigned to the DMBA and shall stay with that DMBA.

Under this embodiment of the invention, it is contemplated that the DMB system may automatically replicate the layout and structure of the prior primary DMB and sub-DMBs to the current primary DMB and sub-DMBs. The DMB system may move all registered users, profiles, transmission rules, routing instructions, distribution rules, tags/file/folder setup and data stored in their primary DMB and/or sub-DMBs from their prior primary DMB and/or sub-DMBs to their current primary DMB and/or sub-DMBs.

In another embodiment of the invention, the one-to-one mapping from DMB to DMBA can be changed from prior DMBA to current DMBA in order to effectuate a change of address so there may not be a need to copy/move all profiles, routing instructions, distribution rules, file/folder setup, data, notifications etc., from prior to current DMB.

VIII. Architecture: DMB System With Virtual Public DMB Stations

Figure 9A:
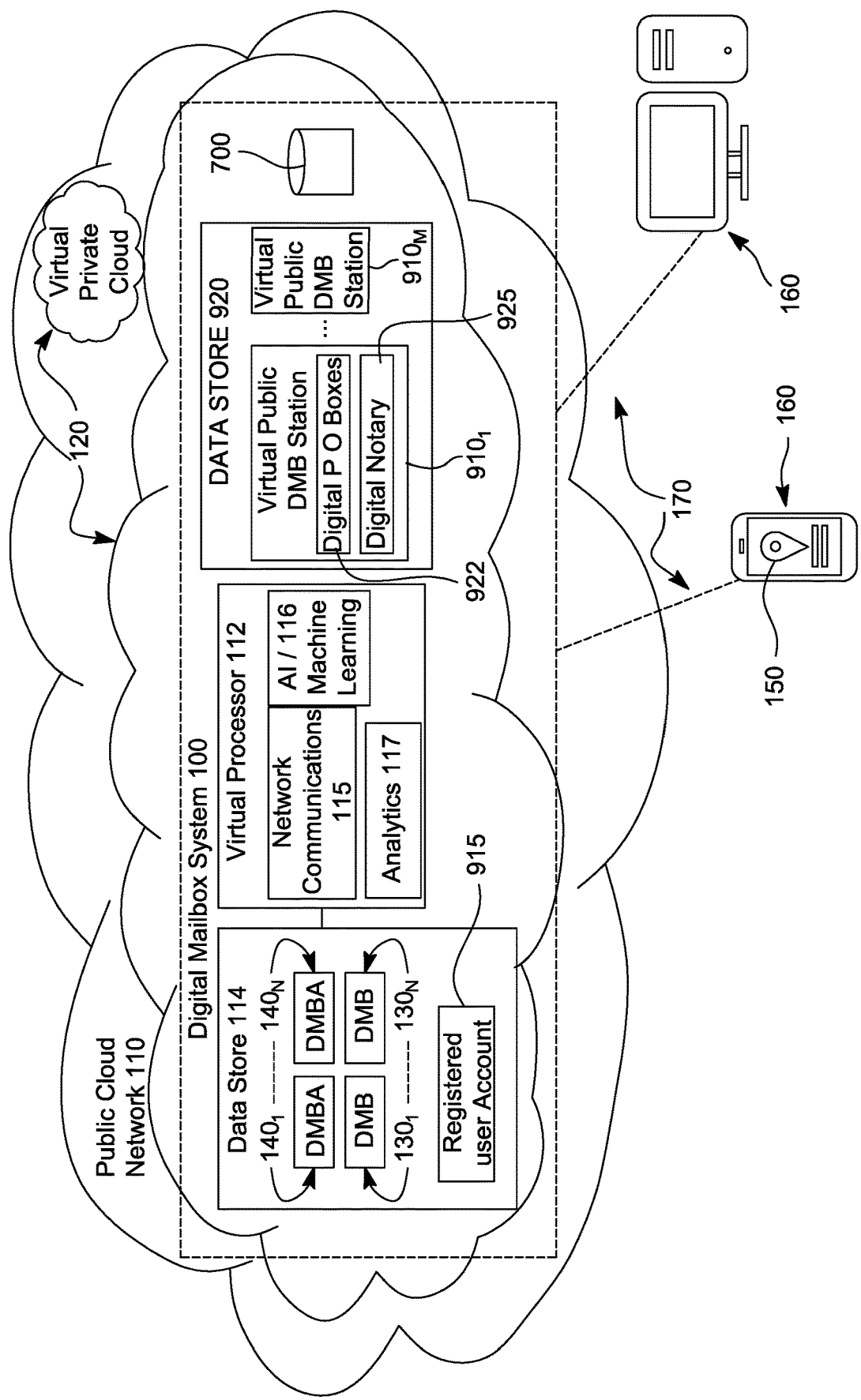
FIG. 9A is a second exemplary embodiment of the DMB system.

Referring now to FIG. 9A, a second exemplary embodiment of the DMB system 100 is shown. Similar in architecture as shown in FIG. 1, the DMB system 100 further includes one or more virtual public DMB stations $910_1$-$910_M$, which are software instances stored within a data store 920 and made available to the public at large, including all registered users. Each virtual public DMB stations $910_1$ . . . or $910_M$ may support a number of different functions, including operating as a service that allows users, who are not registered users of the DMB system 100, with access to send digital mail over the DMB system 100. Herein, these non-registered users can login as a "guest" and is provided privileges/access to utilize all the services offered by the virtual public DMB stations.

When logged on as a "guest," via one of the computing devices, a user may generate and/or send digital mail to a destination DMB via one of the virtual public DMB stations (e.g., station $910_1$). At that time, the user can decide if she or he wants to disclose her or his identity or send the digital mail anonymously. If sent anonymously, the recipient may see that the digital mail was transmitted from the virtual public DMB station $910_1$, but the recipient will not see the DMBA of the user (sender). This operation may be similar to excluding content within a "From" address field of the digital mail message before sending or selecting a "mask" tag, which operates as a selectable feature for the digital mail message that prompts the removal of content (or replacing sender info with 'undisclosed sender') associated with the 'From" address field.

Herein, all users can access/purchase a variety of products and/or services offered by a virtual public DMB station $910_1$ ... or $910_M$, such as certified digital mail, registered digital mail, first class digital mail, or bulk digital mail as described above. As an illustrative example, residential and/or commercial DMBs may have limitations on storage capacity and/or functionalities. For normal usage, a residential DMB may be assigned a prescribed amount of storage space (e.g., three gigabytes (3 GB) of memory space) and a prescribed size and/or number of digital mail messages (e.g., 25 digital mail messages per day sized up to 25 megabytes (MB)) free of cost. Additional storage capacity and functionalities may be purchased for a fee. If a registered or guest user wants to send large digital file(s) to large number of recipients that exceeds their assigned storage capacity and functionalities, instead of buying additional storage space/ functionalities for a fee, she or he may choose to send the large digital file(s) or large number of digital files to selected DMBs from one of the virtual public DMB stations $910_1$ ... or $910_M$ free of cost or for a reduced cost.

Besides operating as a secondary digital mail transmission scheme, each of the virtual public DMB stations $910_1$-$910_M$ may offer the purchase of digital stamps. Upon purchase, the digital stamps may be retained in a registered user account 915 maintained in the data store 114 and/or a DMBU (Digital Mailbox-User) for each registered user as described below, and may be used to pay for any of the services offered by the DMB system 100 such as registered/certified digital mail, first class digital mail, bulk digital mail, or the like. Additionally, a registered user can purchase a digital PO Box 922 virtually located within one of the virtual DMB stations $910_1$-$910_M$ for receiving and sending digital mail. The digital PO Box 922 constitutes a DMB within the DMB system 100, where recipient's mailing address (DMBA) is not disclosed to the sender(s). The digital PO Box 922 may be configured with different storage capacities and functionalities to meet the requirements of the registered users.

Additionally, each of the virtual public DMB stations $910_1$-$910_M$ may offer a digital notary 925: As a portion of the information exchanged between the DMBs $130_1$-$130_N$ and/ or DMB stations $910_1$-$910_M$ pertain to digital, documents/ files, the digital notary 925 can perform operations to digitally notarize the document/file. Such notarization may correspond to digitally affixing information to the documents/files that need digital notarization, such as (i) applying a digital date and time stamp; (ii) applying a digital marking; (iii) applying a digital signature or certificate; or (iv) applying a Quick Response (QR) Codes that may include date/time the document was created, document properties, and the registered user information. The notarized documents can be sent directly by the virtual public DMB station $910_1$ to the intended recipient's DMB with a copy to the sender's DMB to ensure the integrity of the notarized documents. Alternatively, non-fungible tokens may be used for digitally notarizing digital material on a block chain network accessible to the DMB system 100 as well as for financial transactions using crypto-currencies.

Although not shown, one or more of the virtual public DMB stations $910_1$-$910_M$ may incorporate live or animated videos, voice recognition systems, chat rooms, video conferencing (Zoom®, Microsoft® Teams, etc.) with live service representatives. The video-based operability is designed to ensure that the virtual public DMB stations $910_1$-$910_M$ are user-friendly and provide real time digital customer support.

Figure 9B:
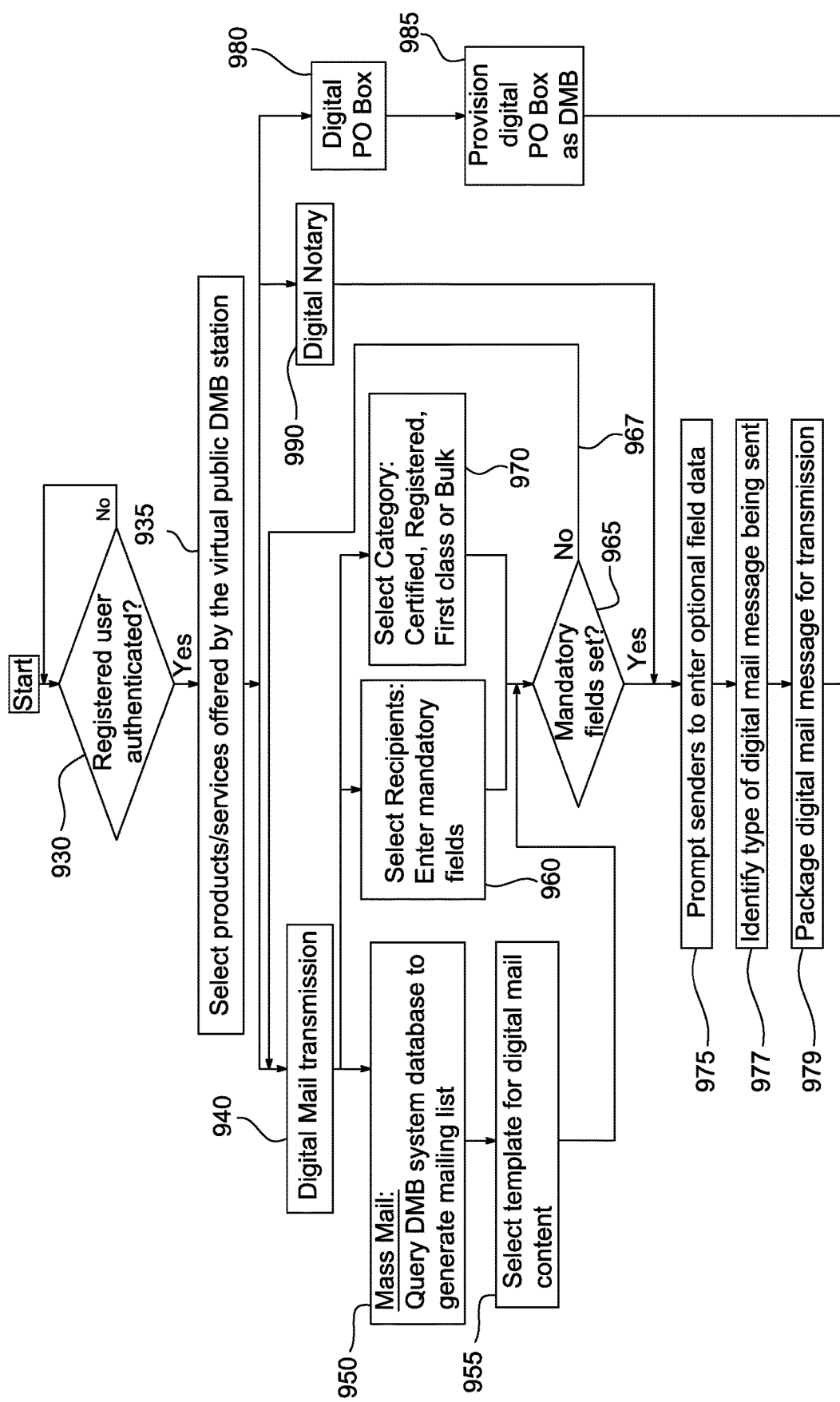
FIG. 9B is an exemplary embodiment of a flowchart illustrating operations directed to services conducted through use of a virtual public DMB station.

Referring now to FIG. 9B, a flowchart of the operations of the transmission of digital mail messages through a virtual public DMB station (e.g., virtual public DMB stations $910_1$) is shown. Herein, to gain access to a virtual public DMB station, the networking logic within the DMB system operates in connection with an application instance of a computing device used by a registered user to establish a connection and authenticate the registered user (operation 930). After authentication is completed, the registered user is able to select products and/or services offered by the virtual public DMB station (operation 935). These products and/or services may include, but are not limited or restricted to (i) digital mail transmission, (ii) digital PO Box creation, and/or (iii) digital notary assistance.

With respect to selection of digital mail transmission, a determination is made as to the selected category of the digital mail (operation 940). Where "Mass Mail" is selected, the virtual public DMB station accesses the DMB system database to enable the user to search and generate a mailing list (operation 950). The mailing list is generated based on search parameters provided as part of a database search query entered through an interface produced by the DMB system and rendered for display to the registered user by the DMB application instance. These search parameters may be directed to consumers with certain demographics such as gender, age, financials (e.g., annual salary, net worth, etc.), geographic location, business industry, or the like. The content of the mailing list is used to automatically populate digital mail messages directed to the businesses and/or consumers identified in the mailing list (operation 955). Prior to transmission of the digital mail messages, the virtual public DMB station determines that all mandatory fields associated with the digital mail messages have been completed such as the outgoing digital mailing address "DMBA" (operation 965). If not, the digital mail messages are returned for review and modification by the sender (operation 967).

Where "priority," "first class," or "bulk" digital mail category is selected, the virtual public DMB station prompts the registered user to enter the digital mailing address or select the 'mass mail' to search the digital mailing address from displayable maps to find one or more primary DMBs and/or sub-DMBs for the intended recipients of the digital mail message (operation 960). Prior to transmission of the digital mail message, the virtual public DMB station determines that all mandatory fields (e.g., DMBA) associated with that digital mail message have been completed (operation 965). If not, the digital mail messages are returned for review and modification by the sender (operation 967).

Where "certified," "registered," "first class," or "bulk" digital mail category is selected, the virtual public DMB station prompts the registered user to select a tag as to the type of acknowledgement of receipt (operation 970). For instance, the tag may simply return a delivery stamp with the day/time of delivery to the primary DMB(s) and/or sub-DMB(s) to which the digital mail is directed. Alternatively, the tag may require the recipient to acknowledge receipt (e.g., selection of a digitally stored signature, typing in name of recipient, etc.) prior to the content of the digital mail message is readable. Prior to transmission of the digital mail message, the virtual public DMB station determines that all mandatory fields (e.g., DMBA) associated with that digital mail message have been completed and an appropriate tag has been set (operation 965). If not, the digital mail messages are returned for review and modification by the sender (operation 967).

Upon confirming that the mandatory fields associated with the digital mail message(s) have been completed, the virtual public DMB station may prompt the sender to enter optional fields, such as the recipient's name (individual or company), title (individual), department (company), or the like (operation 975). Also, the virtual public DMB station may prompt the sender to identify the type of digital mail message(s) being sent, such as marketing materials, financials, or the like (operation 977). Thereafter, the outgoing digital mail message is packaged and routed over a network for delivery to a recipient DMB (operation 979).

After a request to create a digital PO Box is received, the digital PO Box is provisioned (operations 980 and 985). For example, according to one embodiment of the disclosure, the digital PO Box may operate as a primary DMB, where the digital PO Box is provisioned with a common setup (e.g., profile format, routing instructions, distribution rules, restricted sub-folders, notification/forwarding of digital mail) with one of more registered users and/or authorized users granted access to the content of the digital PO Box. Alternatively, the virtual public DMB station may prompt the registered user requesting creation of the digital PO Box to make selections during a provisioning phase; namely customizing the digital PO box with specific routing instructions, distribution rules, sub-folders and/or notification/forwarding schemes that are tailored to the registered user.

With respect to selection of digital notary assistance, a digital notary function is activated to notarize a document or file provided thereto (operation 990). Such notarization may correspond to digitally affixing information to the document or file to be notarized, such as (i) applying a digital timestamp to denote the date and time; (ii) applying a digital marking; (iii) applying a digital signature or certificate in which a representation of the document may be generated and digitally signed or encapsulated to form the digital certificate; or (iv) applying a Quick Response (QR) Codes that may include date/time the document or file was created, document properties, and the registered user information. The notarized documents may be included as part of the digital mail message for transmission from the virtual public DMB station to the intended recipient's DMB. Again, prior transmission of the digital mail message including the notarized document or file, the virtual public DMB station determines that all mandatory fields (e.g., DMBA) associated with that digital mail message have been completed (operation 965). If not, the digital mail messages are returned for review and modification by the sender (operation 967).

IX. Alternate Information Flow/System Architecture

The information flow and architecture of the DMB system may be configured in accordance with a variety of alternative deployments besides those described above. For example, according to one embodiment of the disclosure, the DMB system may create/assign a DMBU (Digital Mailbox-User) for each registered individual user. All digital mail pertaining to a DMBU may be routed from all applicable DMB(s) associated with that DMBU. The DMBs and DMBUs may be configured to transmit data between each other and automatically establish links between them based on registration/access controls. Similarly, all incoming digital mail from all primary DMB and/or sub-DMBs may be routed to DMBU so the registered users can access all their incoming digital mail messages in one DMB rather than checking multiple DMBs.

As an example of the system architecture described above, the DMB system may create a DMBU for an individual (e.g., John Doe) during the registration process described above. The system may automatically establish the links between John Doe's DMBU and all the primary and sub-DMBs to which John Doe has rights and/or access. The profile section of John Doe's DMBU may include: (i) a list of all primary and sub-DMBs to which John Doe has rights/access; (ii) whether he is an administrator or registered user of that primary DMB and/or sub-DMB(s); and profiles, routing instructions and distribution rules may be copied to/from all John Doe's primary DMB(s) and/or sub-DMB(s) from/to his DMBU.

Under this embodiment, the primary DMB and sub-DMBs may function like a conduit and all incoming digital mail pertaining to John Doe from all DMB(s) may be routed to John Doe's DMBU. In this example, all incoming digital mail for John Doe in his residence at 123 ABC Lane, Los Angeles; vacation home at 456 DEF Lane, Santa Barbara; PO Box address and his sub-DMB at XYZ Company; may be routed to John Doe's DMBU.

For this embodiment of the disclosure, the layout of the DMBU may include all the DMBs to which the DMBU has access/rights. All incoming and outgoing digital mail from each DMB may be listed separately within the DMBU. This may be similar to a Gmail or an Outlook Email listing all the email addresses within the same user account.

Based on the above-described architecture, if John Doe leaves XYZ Company or no longer has access to that sub-DMB, John Doe's sub-DMB at XYZ Company may be closed and all incoming digital mail for John Doe at XYZ Company may stay with XYZ Company primary DMB. Since John Doe no longer has a sub-DMB at XYZ Company, no digital mail will be routed from John Doe's sub-DMB at XYZ Company to John Doe's DMBU. The administrator/s of the primary and/or sub-DMB of XYZ Company can also remove the authorization/link to John Doe's DMBU. The DMB system may automatically update the profile section of John Doe's DMBU to remove his access to XYZ Company sub-DMB.

In yet another embodiment of the invention, the DMB system may create a primary DMB for every mailing address globally, a DMBU for every registered user and sub-DMB(s) if necessary, only for commercial addresses. In accordance with this embodiment, when a user registers with the DMB system, the system may (i) create a DMBU for every registered user, (ii) prompt the registered user to enter a list of all primary and sub-DMBs to which s/he wants access, and/or (iii) conduct detailed verification and authentication procedures to ensure the registered user has the rights/access to the primary and/or sub-DMBs requested by registered user. Upon successful verification/authentication, the registered user can setup his/her profiles, transmission rules, routing instructions and distribution rules for those primary and/or sub-DMBs. Under this embodiment of the invention, each registered user will have their own DMBU with their own unique access and rights to the respective primary and/or sub-DMBs and all incoming digital mail will be routed to their DMBU.

Alternatively, upon successful verification/authentication, the DMB system may create a link between the DMBU and one or more primary DMB(s) and/or sub-DMB(s). The system may automatically copy all the profiles, routing instructions and distribution rules to/from each of those primary DMB(s) and/or sub-DMB(s) from/to DMBU. All incoming digital mail pertaining to the registered users from all DMB(s) may be routed to the respective DMBUs. Under this embodiment of the invention, there may be no sub-DMBs for residential addresses, and all registered users may have their own DMBU, which may be linked to all residential primary DMBs.

For commercial addresses, the administrator/s of the primary DMBs may decide if they want to have sub-DMBs for all or certain departments and/or for all or certain employees or any other structure. Many large businesses may prefer to keep all digital mail pertaining to their business under their control within their business network. Such large business entities may not permit incoming and outgoing business digital mail to be transmitted to individual employees DMBUs outside of their business network. Under this embodiment, sub-DMBs may be created for each department and for each employee who is authorized to have a sub-DMB to enable control of all digital mail related to their business within their business network.

Alternately, for businesses that may permit transmission of digital mail to DMBUs, the DMB system may be enabled to create sub-DMB(s) only for various departments or divisions within a primary DMB for commercial mailing addresses. The individual owners or employees' DMBUs may be linked to the respective primary and/or sub-DMBs of commercial mailing addresses. In other words, under this embodiment of the invention, for commercial addresses, sub-DMBs may be created only for sub-divisions or departments within a primary DMB and not for individual business owners or employees. Every individual may have their own DMBU and the DMBUs may be linked to their respective residential primary DMBs, and linked to the respective primary and/or sub-DMBs for commercial mailing addresses. The administrators of the primary and/or sub-DMBs can also authorize to add or remove links to certain DMBUs at any time for any reason.

In yet another embodiment of the invention, all authorized/registered users may be given access to the primary DMB and there may be no sub-DMBs. The DMB system may create one primary DMB for each mailing address globally. All authorized/registered users may have their own login/password for the primary DMB and each of them may have different levels of rights and access controls within the same primary DMB. Each registered user may have their own assigned storage areas within the primary DMB. All the profiles, routing instructions, distribution rules, notifications, forwarding digital mail, content controls, content blocking, file/folder setup etc., for each registered user for both residential and commercial DMBs may be maintained within each primary DMB and there may be no need for sub-DMBs.

In yet another embodiment of the invention, the DMB system may create one primary DMB for each mailing address globally and assign a security key (login & password) for each primary DMB. The DMB system may verify and authenticate the registered users and give them their security key (login & password). The registered users can change their login & password at any time and also give that login and password to whomever they want to give access to their primary DMB. This may be similar to having a Wi-Fi router at home or office and the registered users can give access to their primary DMB to anyone they want to give access to. Under this embodiment of the invention, setting up sub-DMBs, DMBUs, profiles, routing instructions, content controls, content blocking, transmission controls, distribution rules, sub-folders, notifications, forwarding digital mail etc., may be optional.

In yet another embodiment of the invention, the DMB system may create a domain name such as www.DMB.com or www.xxxxxxxx.dmail (a separate domain extension for digital mailbox similar to .com or .net or .org) in a public cloud network. The DMB system may copy/duplicate/recreate/map every mailing address available globally and create a DMBA and one-to-one mapping from DMBA to DMB. The DMB system may automatically create an email address for every mailing address globally using the mandatory fields such as: street#-streetname-suite/apt#-city-statezip@dmb.dmail. In the example given above, the following email addresses may be created manually or using a software program by the DMB system: (a) 123ABClane-losangeles-ca90015@dmb.dmail, (b) 456DEFlane-irvine-ca92603@dmb.dmail, (c) pobox789-sanfrancisco-ca90500@dmb.dmail, etc. All emails to/from the domain www.DMB.dmail may be routed to the respective DMBs. Creating emails based on only the mandatory fields of the mailing address as described above may be optional and may be offered to the registered users as an additional or supplementary service of the DMB system. These emails may also be used for transmission of data between DMBs within the DMB system. The DMB system may register/validate/authenticate users prior to giving them access to requested residential and/or commercial DMBs. Under this embodiment of the invention, setting up sub-DMBs, DMBUs, profiles, routing instructions, content controls, content blocking, transmission controls, distribution rules, sub-folders, notifications, forwarding digital mail etc., may be optional.

Figure 10A:
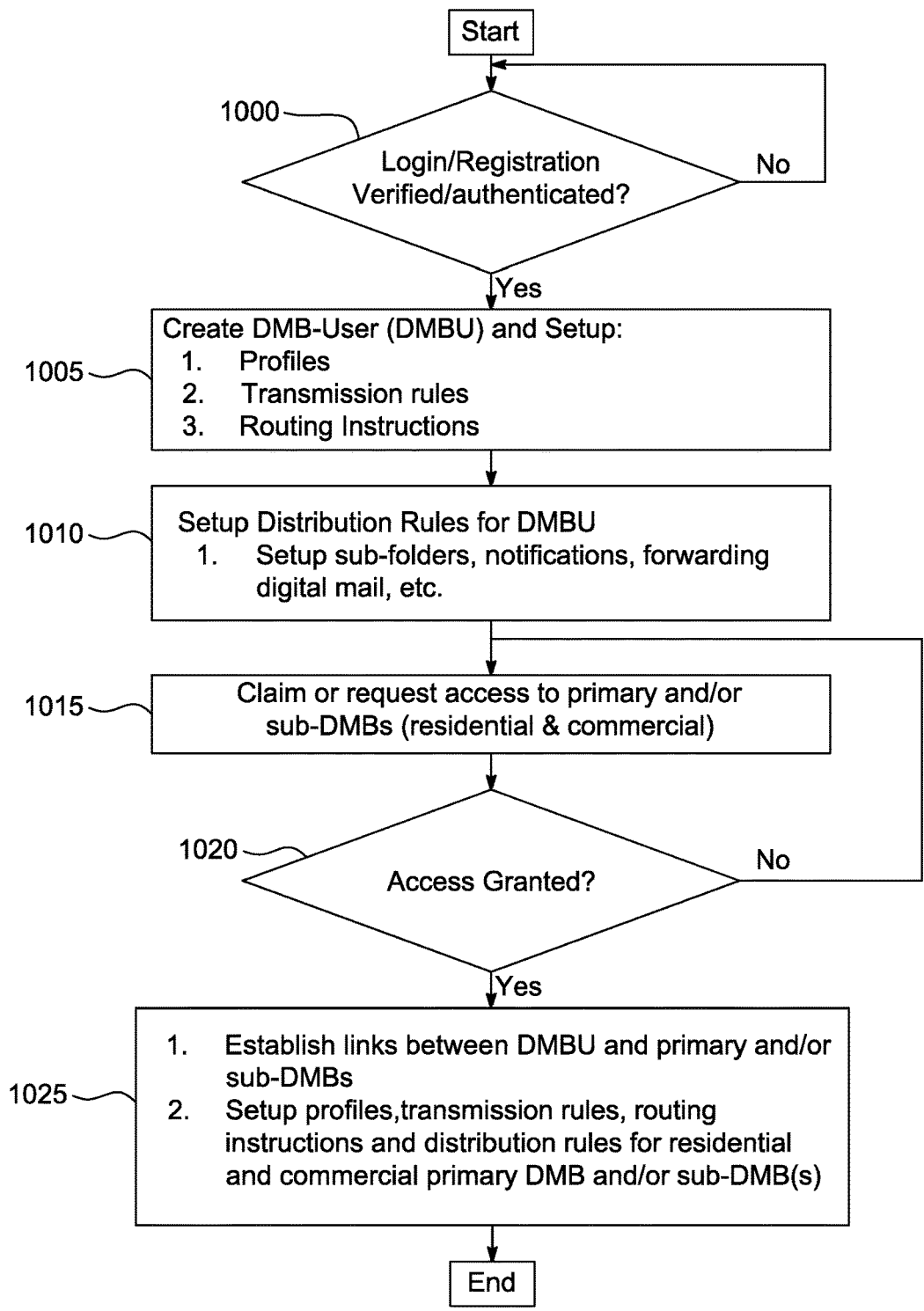
FIG. 10A is an exemplary embodiment of the DMB system configured in accordance with a DMBU (Digital Mailbox-User) deployment.

Referring now to FIG. 10A, an illustrative embodiment of the DMB system configured in accordance with a DMBU (Digital Mailbox-User) deployment is shown. Herein, communications are established between networking logic of the DMB system and an application instance of a computing device used by a registered user, where the registered user is authenticated (operation 1000). After authentication has been completed, the DMB system creates a DMBU for the registered user, and the registered user is enabled to setup the DMBU.

Upon successful authentication, the registered user can setup the profiles, routing instructions and transmission rules for the DMBU, along with content controls (operation 1005). Herein, the content controls may include, but are not limited or restricted to content blocking (e.g., preventing the receipt of certain content based on source, content type (based on type designation or data after analysis). The transmission rules and restrictions may include, but are not limited or restricting to preventing/restricting incoming digital mail messages from certain senders or preventing/restricting certain categories or types of incoming digital mail messages. In addition, the registered user can setup the distribution rules, sub-folders, notification/forwarding scheme etc., for his/her DMBU (operation 1010).

After setup of the DMBU has been completed, the registered user claims or requests access to residential and/or commercial primary and/or sub-DMBs (operation 1015). In a residential primary DMB, if the 'proof of address' submitted by a registered user is verified/authenticated, the DMBS may grant rights/access to the requested residential primary DMB. The administrator of a commercial primary DMB must approve and grant permission to the registered user to access the commercial primary DMB (operation 1020).

If the registered user is unable to submit "proof of address" for a residential primary DMB because s/he moved to a new location (e.g., the registered user moved into a multi-family dwelling unit with other roommates and his/her driver's license has the old address and the lease agreement or utility bills are under another roommate's name, etc.), the registered user may request access to the primary residential DMB from an administrator or another registered user of that residential primary DMB. An administrator or any adult registered user of that residential primary DMB may grant access to the new roommate. The DMBS may grant such access temporarily for a short term until the new roommate is able to submit proof of address. In other words, the DMBS may require every registered user to submit proof of address for their residential primary DMB in order to maintain the integrity and reliability of the DMB system.

For a commercial DMB, access may be granted only by an administrator. If access is granted, the DMB system establishes communication links between the DMBU and these primary and/or sub-DMBs. For a residential primary DMB, the registered user may have unrestricted access and rights to setup his/her profiles, transmission rules, routing instructions and distribution rules. For a commercial primary and/or sub-DMB, the registered user may have limited/restricted rights for setting up profiles, transmission rules and routing instructions, but s/he may have unrestricted rights to setup their distribution rules that meet their corporate guidelines. In other words, the administrator/s of a commercial primary and/or sub-DMB(s) shall determine the profiles, transmission rules and routing instructions for the primary and/or sub-DMBs, and the DMBU (registered users/employees) may have limited rights in setting up the profiles, transmission rules and routing instructions (operation 1025).

In another embodiment of the invention, DMBU may be linked only to residential primary DMB and not to commercial primary or sub-DMBs. A business entity may register by providing proof of address and claim their rights/access to their commercial primary DMB. Upon successful authentication, the administrators of the commercial primary DMB can create sub-DMBs for various departments and for each employee within their commercial primary DMB. The administrators may setup the profiles, transmission rules and routing instructions for each of the sub-DMBs and grant access to their employees for each of those sub-DMBs.

Each primary DMB and sub-DMB listed within a DMBU corresponds to a separate DMB similar to a separate folder with multiple sub-folder architecture. In one embodiment of the invention, the DMB system copies/provisions the profiles, routing instructions, transmission rules, distribution rules, sub-folders, notification/forwarding scheme and the data applicable for the DMBU from each of those primary and/or sub-DMBs to the DMBU.

In the event that the DMBU is no longer permitted access to any of the primary DMB(s) and/or sub-DMB(s), such as a change of address, termination of employment, death or any other event where a DMBU is no longer a registered user for that primary DMB(s) and/or sub-DMB(s), the DMB system is configured to remove the communication link between the DMBU and that primary DMB(s) and/or sub-DMB(s).

In one embodiment of the invention, a registered user may continue to receive digital mail sent to them under a mailing address (DMBA) even after they move out of that residence. As an example, if a child moves out of his or her parents' home, he or she may still be registered in their parents' home address DMB and continue to receive the digital mail addressed to them and sent to his/her parents' home address DMB as long as the parents' grant rights/access to them. Similarly, an individual may be a "registered" user of multiple primary DMB(s) and/or sub-DMB(s) (such as s/he owns a vacation home or a rental property, has a PO Box, has a sub-DMB with an employer etc.), and all those primary DMB(s) and/or sub-DMB(s) may be displayed through the DMB application instance 150 in accordance with a selected layout/design as shown in FIG. 10B.

Figure 10B:
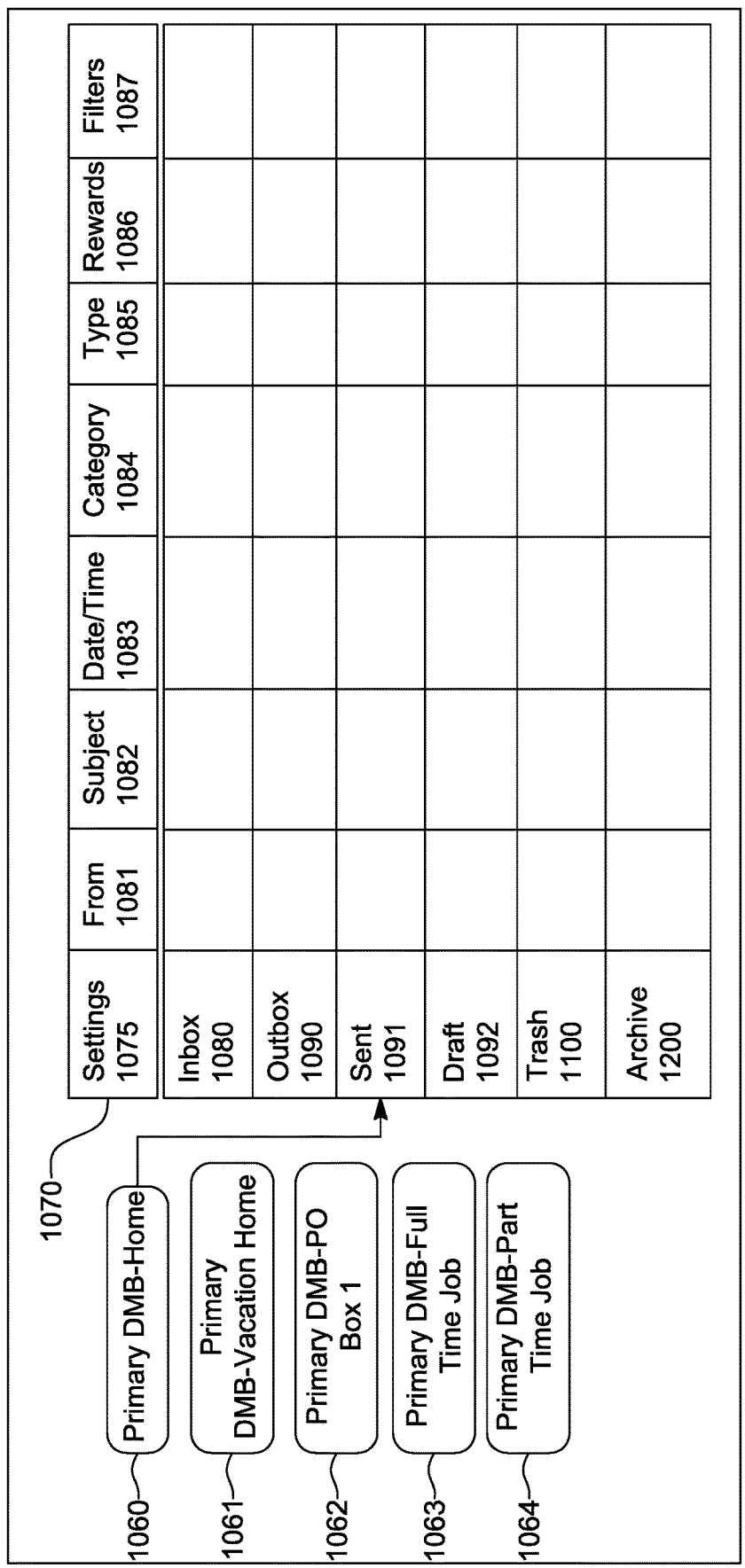
FIG. 10B is an exemplary embodiment of the DMBU layout and design configured in accordance with a DMBU deployment.

Referring now to FIG. 10B, an illustrative embodiment of a layout of the DMBU display 1050 generated by application layer software 150 is shown. Herein, the DMBU display 1050 includes display elements 1060-1064, where each display element 1060 . . . or 1064 is associated with a DMB to which a registered user has access/rights. Herein, the display elements 1060-1064 may uniquely correspond to primary DMBs 1060-1062 and/or sub-DMBs 1063-1064, respectively. Upon selection of one of the display elements corresponding to a particular DMB (e.g., display element 1060 corresponding to a primary DMB referenced as "home"), a display area 1070 for the digital mail associated with the "home" DMB is rendered.

As shown in FIG. 10B, the digital mail display area 1070 may be configured similar to an email system such as Microsoft Outlook or Gmail, for instance, and may include multiple folders such as "Inbox", "Outbox", "Sent Items", "Draft", "Trash", "Archive," etc. Registered users can create as many sub-folders as they like under each of these folders and label them whatever they like and move their digital mail to the respective sub-folders to keep their digital mail organized. Alternatively, they can instruct the DMB system to automatically move incoming digital mail from specific senders or category or type to certain sub-folders.

As shown in FIG. 10B, when the registered user is in their 'Primary DMB-Home (box 1060)' and clicks on Settings 1075', it may display the profiles, transmission rules, routing instructions and distribution rules of that primary DMB-Home. The registered user can add/change the settings based on their level of access/rights to that primary DMB-Home (based on whether s/he is an administrator, registered or authorized user) from their DMBU. Settings might display a list of all registered and authorized users who have access to this 'Primary DMB-Home', when they were given access, how they were given access (such as by providing 'proof of address', authorized by another registered user, granted permission by another registered user etc.). Since all users can see everyone accessing the DMB, any registered user can file a dispute with DMBS if they believe someone has been granted access by mistake or has gained access fraudulently. This process will enable DMBS to revoke access if someone was granted access by mistake or gained access fraudulently. Also, any registered user or administrator of a residential primary DMB who granted permission/access to another registered user or authorized someone else to have access to their DMB, can revoke their access at any time for any reason.

Referring still to FIG. 10B, when they click on "Inbox 1080', the DMB system may list all digital mail received and may display the following in the column headers: (a) 1081 From who they received the digital mail; (b) 1082 Subject line of that digital mail; (c) 1083 Date & time the digital mail was received; (d) 1084 Category of incoming digital mail which may be denoted by a letter such as 'C' for Certified; 'F' for First Class and 'B' for Bulk Mail; (e) 1085 Type of incoming digital mail which may be denoted by a letter such as 'F' for Financial, 'M' for Marketing, 'P' for Personal, 'O' for Other; (f) 1086 Rewards for clicking on that digital mail as described below; and (g) 1087 Filters to include a variety of commands/instructions such as 'save', 'move', 'delete', 'archive', 'mark as unread', 'highlight', 'level of importance', 'sort by', 'label', etc. The display area 1070 further includes a set of folders such as Outbox 1090 (sent digital mail), Draft 1092 (in-process messages), Trash 1100 (deleted digital mail messages) and/or Archive 1200, for example.

Referring still to FIG. 10B, the DMB system 100 may be configured to offer each user a prescribed rewards amount (e.g., 25 cents per click) as an incentive for the user to read (click) the digital mail. The "rewards 1086" column displays the type and amounts of rewards offered by a sender for clicking that digital mail. The rewards column may also display an expiration date of the reward. The DMB system maintains a log of the types of "rewards" in accordance with a tiered activity metric such as a first reward amount for clicking the digital mail (e.g., 25 cents for "Outside Click"), and a second additional reward amount upon clicking on a link within the content of the digital mail (e.g., 50 cents for "Inside Click") that may take the user to a website or a landing page for example. The DMB system may display a letter on the rewards column (such as "I") to indicate/communicate to the registered user there are additional "Inside Rewards" offered by the sender. The DMB system may further be configured to offer different amounts of rewards to the user for clicking on different links within the content of the digital mail such as 50 cents for clicking on a link that may take the user to their website or landing page, $1 for clicking on a link to a video, $2 for watching the video, $25 for completing a survey etc. In order for us to keep track of the outside and inside clicks and implement variable amounts of rewards for 'Inside Clicks', all the content related to those links may be hosted within the DMBS platform.

Herein, the DMB application instance is configured to render and control operability of the DMBU display 1050, which includes rendering content associated with the display elements 1060-1064 and the display area 1070 including controlling the issuance of rewards to one click per digital marketing mail per user. The DMB system may include a reward counter that monitors and maintains the number of clicks by registered users, amount of money to collect from businesses for rewards and the amount of money to be paid to registered users under the rewards program.

For change of address, termination of employment, death or for any other event where a DMBU is no longer a registered user for that primary DMB or sub-DMB (e.g., "home" primary DMB), the DMB system 100 will remove the communication link and thereby remove rendering of the selectable display element for that primary DMB or sub-DMB (e.g., display element 1060 for "home" primary DMB).

Herein, the DMB system architecture can be designed in many different ways for mapping DMB to DMBA, registration and access controls, granting permissions and authorizing others to access their DMB, setting up the primary DMB and/or sub-DMBs, DMBUs, transmission of data and flow of information for incoming & outgoing digital mail, forwarding digital mail, change of address, change of registered users of primary and sub-DMBs etc. It is contemplated that the operability of the DMB system as described above may be conducted by virtual and/or physical processors associated with one or more networks (e.g., cloud networks, etc.). While this invention is described with reference to specific embodiments, various modifications and changes (such as changes to the setup of DMBs, sub-DMBs, DMBUs, profiles, transmission rules, routing instructions, content controls, content blocking, distribution rules, transmission of data between DMBs, sub-DMBs & DMBUs, and flow of information for incoming & outgoing digital mail messages, forwarding digital mail etc.) may be made by someone skilled in the art without departing from the broader spirit and scope of the invention.

What is claimed is:

1. A digital content distribution system comprising:
a virtual processor; and
a plurality of digital mailbox systems, each digital mailbox system being (i) a data store including a non-transitory storage medium and is addressable by a digital mailbox address and (ii) assigned to one or more registered users associated with a property pertaining to the digital mailbox address, wherein the digital mailbox address includes a physical address of the property without linking to an email address or an account number or without mapping to the email address or the account number,
wherein a first digital mailbox system is configured to transmit digital materials to and receive digital materials from a second digital mailbox system different than the first digital mailbox system and one or more registered users are provided access to the digital materials received by the first digital mailbox system upon authentication, and
wherein the digital materials received by the first digital mailbox system from the second digital mailbox system are transmitted over the network using a first digital mailbox address that comprises at least a street number, a street name and a zip code identifying a first physical address for a first property.

2. The digital content distribution system of claim 1, wherein the first physical address further includes a name of a recipient of the digital materials being a registered user of the one or more registered users and a city in which the first property resides.

3. The digital content distribution system of claim 1, wherein the second digital mailbox system is configured to award a first reward amount to a registered user of the one or more registered users as an incentive for opening the digital materials.

4. The digital content distribution system of claim 1, wherein the first digital mailbox system is uniquely associated with the first digital mailbox address and the first digital mailbox system is associated with one or more secondary digital mailboxes into which the digital materials are further filtered and segmented for directing the digital material to a targeted registered user and a registration of the registered user to at least a first secondary digital mailbox of the one or more secondary digital mailboxes comprises configuring a user profile associated with the first digital mailbox address associated with the first secondary digital mailbox that causes a notification or a forwarding of all or certain types of digital materials to the first secondary digital mailbox, and
wherein each of the one or more secondary digital mailboxes corresponds to (i) a registered user living at the physical address, (ii) a user providing proof of address to gain access to a digital mailbox corresponding to a physical address, (iii) a registered user living at the physical address granting access to someone dwelling at the physical address, or (iv) a user employed at a commercial mailing address corresponding to the physical address.

5. The digital content distribution system of claim 1, wherein operability of the first digital mailbox system is configured, based on routing instructions, to filter and prevent receipt and storage of one or more categories or types of digital material.

6. The digital content distribution system of claim 5, wherein the routing instructions to filter and preclude storage of at least one category of the digital material including (i) certified digital mail, (ii) priority digital mail, (iii) registered digital mail, (iv) first class digital mail, (v) bulk digital mail, or (vi) saturation digital mail.

7. The digital content distribution system of claim 5, wherein the routing instructions to filter and preclude storage of at least one type of the digital material including (i) marketing digital material, (ii) credit card digital material, or (iii) bills.

8. The digital content distribution system of claim 1, wherein the first digital mailbox system is configured to apply a masking operation to a digital mail message being transmitted to remove or make unreadable a first digital mailbox address for the first digital mailbox system from the digital mail message including the digital materials.

9. The digital content distribution system of claim 1, wherein the first digital mailbox system is configured to apply a masking operation to a digital mail message being transmitted to remove or make unreadable information within a body of the digital mail message to any registered or authorized user other than a selected registered or authorized user of the first digital mailbox system.

10. The digital content distribution system of claim 3, wherein the second digital mailbox system is configured to award a second reward amount upon the registered user of the first digital mailbox system clicking on a link being content of the digital materials.

11. The digital content distribution system of claim 1, wherein the first digital mailbox system is uniquely associated with a first digital mailbox address and the first digital mailbox system is associated with one or more secondary digital mailboxes including a digital mailbox-user created or assigned to each registered user of the digital mailbox system.

12. The digital content distribution system of claim 1, wherein in response to the digital materials being assigned as a certified digital mail message, the first digital mailbox system is configured to require a recipient of the certified digital mail message, being a registered user of the one or more registered users, to digitally sign the certified digital mail message before permitting the certified digital mail message from being opened .

13. The digital content distribution system of claim 1, wherein the digital materials pertain to a mass digital mailing campaign that targets recipients using the demographic data of the recipients within a geographic area inclusive of the physical address.

14. The digital content distribution system of claim 1, wherein the first digital mailbox system further includes a virtual public digital mailbox stations being one or more software instances stored within a data store and made available to registered users of the digital content distribution system, a first software instance of the one or more software instances operating as a digital notary to digitally notarize a document being provided as part of the digital materials.

15. The content distribution system of claim 1, wherein the digital mailbox address is devoid of any uniform resource locator or domain name.

16. The content distribution system of claim 1, wherein the first primary digital mailbox is configured to receive a digital check addressed to a registered user from a second digital mailbox system being different than the first digital mailbox, and configured to click on a link to enter the bank account information of the first primary digital mailbox user to deposit the check electronically.

17. A computerized method of distributing digital content within a digital content distribution system including different digital mailbox systems each uniquely associated with a physical address, comprising:
   registering, a user for a digital mailbox with a cloud network service supporting operations of the digital content distribution system; and
   authenticating access by the user to a first digital mailbox system of the digital content distribution system,
   wherein the authenticating access by the user comprises evaluating a form of identification and a proof of address submitted by the user so that, upon authentication of the user to access the first digital mailbox system, the digital content distribution system provides the user with access to received digital materials by the first digital mailbox system,
   wherein the first digital mailbox system is configured to transmit digital mail messages to and receive digital mail messages from a second digital mailbox system different than the first digital mailbox system, and
   wherein the digital materials of the digital mail messages received by the first digital mailbox system from the second digital mailbox system are electronically addressed for transmission over a network using a first digital mailbox address that includes content identifying a first physical address of the property without linking to an email address or an account number or without mapping to the email address or the account number, the content identifying the first physical address comprises at least a street number, a street name and a zip code.

18. The computerized method of claim 17, wherein the first digital mailbox system corresponds to a data store, maintained by the cloud network service, that is addressable via a network address uniquely associated with a physical address of a residence or commercial building, the data store accessible by at least the user being authenticated by at least verifying an identity of the user and verifying a proof of address that the user resides at the residence by artificial intelligence logic being executed on a compute engine operating within the cloud computer network or the user is an administrator of a business occupying the physical address at the commercial building.

19. The computerized method of claim 17 further comprising:
   setting access controls associated with the first digital mailbox system, the access controls include a first access control configured to generate a displayable element to identify one or more users granted permission or authorized access to the first digital mailbox system by the authenticated user and a second access control configured to either (i) create one or more digital mailbox subsystems associated with the first digital mailbox system or (ii) create one or more digital mailbox subsystems associated with each registered user of the first digital mailbox system.

20. The computerized method of claim 19, wherein each of the one or more digital mailbox subsystem corresponds to a data store uniquely associated with the one or more users granted permission or authorized access to the first digital mailbox system and each of the one or more digital mailbox subsystem corresponds to a digital mailbox user (DMBU).

21. The computerized method of claim 20, wherein the setting of the access controls further comprises configuring a user profile along with transmission rules and routing instructions for each of the one or more digital mailbox subsystems associated with the first digital mailbox system.

22. The computerized method of claim 20, wherein each DMBU operates as a data store to which all digital mail messages directed to (i) one or more digital mailbox systems associated with the authenticated user including the first digital mailbox system, and (ii) any digital mailbox users associated with the authenticated user.

23. The computerized method of claim 17 further comprising:
reviewing tags of the received digital mail messages;
determining a category of a plurality of categories assigned to each of the received digital mail messages; and
routing each of the received digital mail messages to respective sub-folders assigned to a selected category of the plurality of categories by the sender.

24. The computerized method of claim 17 further comprising:
responsive to authenticating of the user, providing the user with an ability to change his or her digital mailbox address that comports with a change in the physical address of the user.

25. A digital content distribution system comprising:
a plurality of primary digital mailbox systems, each primary digital mailbox system being (i) a data store including a non-transitory storage medium and is addressable by a digital mailbox address and (ii) assigned to one or more users associated with a property pertaining to the digital mailbox address, wherein the digital mailbox address includes a physical mailing address of the property and accessible by one or more users associated with the property identified by the physical mailing address of the property without linking to an email address or an account number or without mapping the email address or the account number; and
one or more digital mailbox subsystems associated with at least a first primary digital mailbox system, each of the one or more digital mailbox subsystems being assigned to a user of the one or more users who is granted permission or authorized access to the first primary digital mailbox system,
wherein the first primary digital mailbox system is configured to receive digital materials, the digital materials are transmitted over a network using a first digital mailbox address that comprises at least a street number, a street name and a zip code identifying a first physical address for a first property.

26. The digital content distribution system of claim 25, wherein in response to the digital materials being a certified digital mail message or a registered digital mail message, the first primary digital mailbox system is configured to require a recipient of the certified digital mail message or the registered digital mail message to digitally sign the certified digital mail message or the registered digital mail message before permitting the certified digital mail message or the registered digital mail message from being opened.

27. The digital content distribution system of claim 25, wherein a digital mail message received by the first primary digital mailbox system is automatically routed to a particular folder within the data store based on a category of the digital mail message, the category can be assigned as a priority or first class mail message being placed into a different folder than mass marketing digital mail messages.

28. The digital content distribution system of claim 25, wherein the first primary digital mailbox is configured to support a digital voting scheme in which a digital mail message corresponds to a digital mail-in ballot in which the system is configured to ensure receipt by an intended recipient at the physical mailing address and ensure compliance with access controls to preclude contents of the digital mail-in ballot from being viewed by anyone except the intended recipient and authorized users issuing the mail-in ballot.

29. The digital content distribution system of claim 25, wherein each of the plurality of primary digital mailbox systems including a virtual public digital mailbox station that is configured to send digital material anonymously from the virtual public digital mailbox station.

30. The digital content distribution system of claim 25, wherein the first primary digital mailbox system is further configured to offer each user a prescribed reward as an incentive to open the received digital materials.

31. The digital content distribution system of claim 30, wherein the prescribed reward is based on a level of activity conducted by a user when opening the received digital materials.

32. The digital content distribution system of claim 30, wherein the prescribed reward includes a first reward amount upon opening the digital materials and a second reward amount upon selecting of a link included in the digital materials, the second reward amount being greater monetary amount than the first reward amount.

* * * * *